(12) United States Patent
Sugitani

(10) Patent No.: US 9,398,535 B2
(45) Date of Patent: Jul. 19, 2016

(54) SYSTEM AND METHOD FOR POWER SAVING IN WIRELESS COMMUNICATION APPARATUS

(71) Applicant: PANASONIC CORPORATION, Osaka (JP)

(72) Inventor: Toshiyuki Sugitani, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 126 days.

(21) Appl. No.: 13/682,992

(22) Filed: Nov. 21, 2012

(65) Prior Publication Data

US 2013/0137422 A1    May 30, 2013

(30) Foreign Application Priority Data

Nov. 24, 2011    (JP) ................... 2011-256462

(51) Int. Cl.
*H04M 1/73*    (2006.01)
*H04W 52/02*    (2009.01)

(52) U.S. Cl.
CPC ............ *H04W 52/0241* (2013.01); *Y02B 60/50* (2013.01)

(58) Field of Classification Search
CPC ..................... H04W 52/0261; H04W 52/0274; H04W 24/04; H04W 52/0251; H04W 52/0219; H04W 52/0235; H04W 52/0277
USPC ........................................................ 455/574
See application file for complete search history.

(56) References Cited

U.S. PATENT DOCUMENTS

| 5,375,254 | A | 12/1994 | Owen |
| 6,804,542 | B1 | 10/2004 | Haartsen |
| 7,024,191 | B2 | 4/2006 | Ofuji |
| 2003/0032441 | A1 | 2/2003 | Ofuji |
| 2004/0018817 | A1* | 1/2004 | Kanayama ........ H04W 52/0229 455/77 |
| 2004/0104709 | A1* | 6/2004 | Yamaji et al. ................. 320/150 |
| 2004/0180702 | A1* | 9/2004 | Hughes ........................ 455/574 |
| 2005/0157671 | A1 | 7/2005 | Sugitani |

(Continued)

FOREIGN PATENT DOCUMENTS

| EP | 0 490 441 A2 | 6/1992 |
| EP | 1 696 686 A2 | 8/2006 |

(Continued)

OTHER PUBLICATIONS

International Search Report dated Mar. 5, 2013.

(Continued)

*Primary Examiner* — Quan M Hua
(74) *Attorney, Agent, or Firm* — Seed IP Law Group PLLC

(57) ABSTRACT

A wireless communication apparatus includes a power switch unit that switches a power supplied from a battery, and a timer unit that measures a time period through a power supplied from the battery. The power switch unit is turned on upon receiving a trigger for turning on the power supply and turned off upon receiving a trigger for turning off the power supply. When a wireless unit and a control unit are supplied with the power through the power switch unit in accordance with the trigger for turning on the power supply, the control unit controls to receive a wireless signal from a different wireless communication apparatus, and the control unit then sets a given value of the expiration of the time period in the timer unit and outputs the trigger for turning off the power supply to the power supply control unit.

6 Claims, 20 Drawing Sheets

(56) References Cited

U.S. PATENT DOCUMENTS

| | | |
|---|---|---|
| 2006/0068751 A1* | 3/2006 | Chandra et al. ............ 455/343.2 |
| 2006/0189312 A1 | 8/2006 | Kubo et al. |
| 2010/0153761 A1* | 6/2010 | Nishioka ........................ 713/323 |
| 2010/0325194 A1* | 12/2010 | Williamson et al. .......... 709/203 |

FOREIGN PATENT DOCUMENTS

| | | |
|---|---|---|
| GB | 2 415 334 A | 12/2005 |
| GB | 2415334 | * 12/2005 |
| JP | 5-14458 | 1/1993 |
| JP | 5-102900 | 4/1993 |
| JP | 7-147579 | 6/1995 |
| JP | 8-82642 | 3/1996 |
| JP | 2003-60551 | 2/2003 |
| JP | 2007-202134 | 8/2007 |

OTHER PUBLICATIONS

Extended European Search Report dated Mar. 31, 2015, for corresponding EP Application No. 12852187.9-1855 / 2783467, 8 pages.

* cited by examiner

FIG.6

| SYNCHRONIZATION SIGNAL | CONTROL DATA 1 | ERROR DETECTION CODE 1 |
|---|---|---|

FIG.7

| SYNCHRONIZATION SIGNAL | CONTROL DATA 1 | ERROR DETECTION CODE 1 | CONTROL DATA 2 | ERROR DETECTION CODE 2 | CONTROL DATA 3 | ERROR DETECTION CODE 3 | CONTROL DATA 4 | ERROR DETECTION CODE 4 | CONTROL DATA 5 | ERROR DETECTION CODE 5 |

FIG.8

| Frame Number | Synchronization Signal | Information | Error Detection Code |
|---|---|---|---|
| FRAME NUMBER: 16 × N+0 | SYNCHRONIZATION SIGNAL | PT CALL INFORMATION | ERROR DETECTION CODE 1 |
| FRAME NUMBER: 16 × N+1 | SYNCHRONIZATION SIGNAL | NT MASTER UNIT IDENTIFICATION INFORMATION | ERROR DETECTION CODE 1 |
| FRAME NUMBER: 16 × N+2 | SYNCHRONIZATION SIGNAL | NT MASTER UNIT IDENTIFICATION INFORMATION | ERROR DETECTION CODE 1 |
| FRAME NUMBER: 16 × N+3 | SYNCHRONIZATION SIGNAL | NT MASTER UNIT IDENTIFICATION INFORMATION | ERROR DETECTION CODE 1 |
| FRAME NUMBER: 16 × N+4 | SYNCHRONIZATION SIGNAL | NT MASTER UNIT IDENTIFICATION INFORMATION | ERROR DETECTION CODE 1 |
| FRAME NUMBER: 16 × N+5 | SYNCHRONIZATION SIGNAL | NT MASTER UNIT IDENTIFICATION INFORMATION | ERROR DETECTION CODE 1 |
| FRAME NUMBER: 16 × N+6 | SYNCHRONIZATION SIGNAL | NT MASTER UNIT IDENTIFICATION INFORMATION | ERROR DETECTION CODE 1 |
| FRAME NUMBER: 16 × N+7 | SYNCHRONIZATION SIGNAL | NT MASTER UNIT IDENTIFICATION INFORMATION | ERROR DETECTION CODE 1 |
| FRAME NUMBER: 16 × N+8 | SYNCHRONIZATION SIGNAL | QT SYSTEM INFORMATION | ERROR DETECTION CODE 1 |
| FRAME NUMBER: 16 × N+9 | SYNCHRONIZATION SIGNAL | NT MASTER UNIT IDENTIFICATION INFORMATION | ERROR DETECTION CODE 1 |
| FRAME NUMBER: 16 × N+10 | SYNCHRONIZATION SIGNAL | NT MASTER UNIT IDENTIFICATION INFORMATION | ERROR DETECTION CODE 1 |
| FRAME NUMBER: 16 × N+11 | SYNCHRONIZATION SIGNAL | NT MASTER UNIT IDENTIFICATION INFORMATION | ERROR DETECTION CODE 1 |
| FRAME NUMBER: 16 × N+12 | SYNCHRONIZATION SIGNAL | NT MASTER UNIT IDENTIFICATION INFORMATION | ERROR DETECTION CODE 1 |
| FRAME NUMBER: 16 × N+13 | SYNCHRONIZATION SIGNAL | NT MASTER UNIT IDENTIFICATION INFORMATION | ERROR DETECTION CODE 1 |
| FRAME NUMBER: 16 × N+14 | SYNCHRONIZATION SIGNAL | NT MASTER UNIT IDENTIFICATION INFORMATION | ERROR DETECTION CODE 1 |
| FRAME NUMBER: 16 × N+15 | SYNCHRONIZATION SIGNAL | NT MASTER UNIT IDENTIFICATION INFORMATION | ERROR DETECTION CODE 1 |

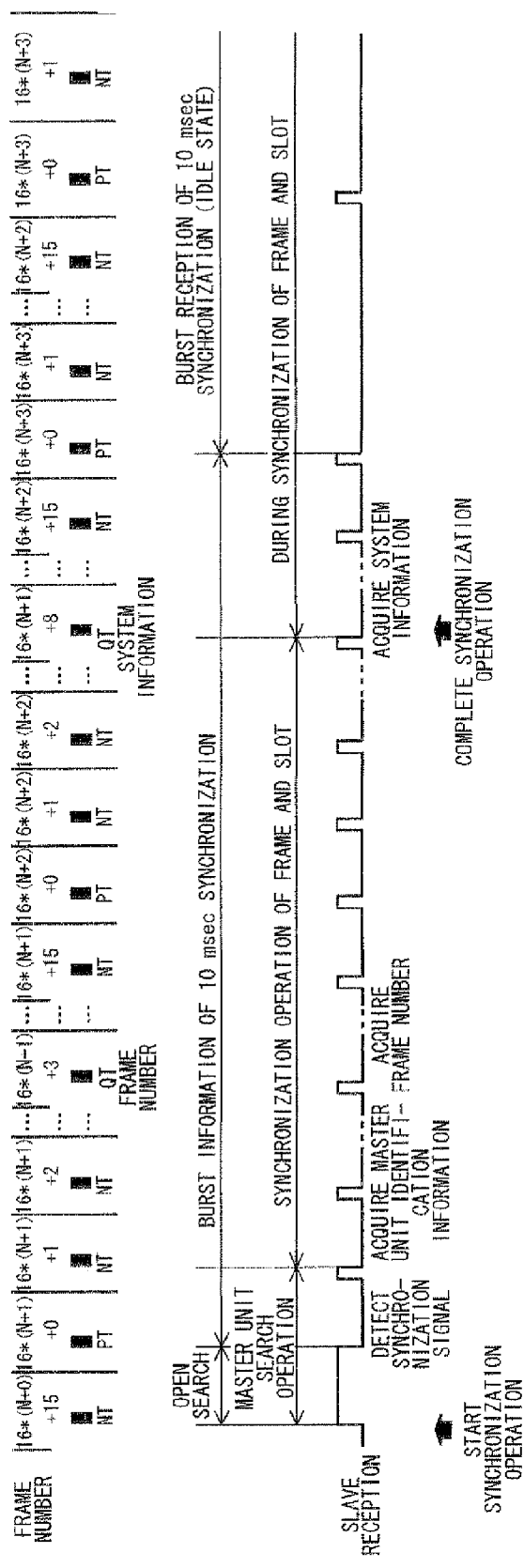

FIG. 11

| Frame Number | | | | | | | | | | | |
|---|---|---|---|---|---|---|---|---|---|---|---|
| 16×N+0 | SYNCHRO-NIZATION SIGNAL | PT CALL INFORMATION | ERROR DETECTION CODE 1 | CONTROL CHANNEL INFORMATION | ERROR DETECTION CODE 2 | SPACE CHANNEL INFORMATION | ERROR DETECTION CODE 3 | CONTROL CHANNEL INFORMATION | ERROR DETECTION CODE 4 | SPACE CHANNEL INFORMATION | ERROR DETECTION CODE 5 |
| 16×N+1 | SYNCHRO-NIZATION SIGNAL | NT MASTER UNIT IDENTIFICATION INFORMATION | ERROR DETECTION CODE 1 | CONTROL CHANNEL INFORMATION | ERROR DETECTION CODE 2 | SPACE CHANNEL INFORMATION | ERROR DETECTION CODE 3 | CONTROL CHANNEL INFORMATION | ERROR DETECTION CODE 4 | SPACE CHANNEL INFORMATION | ERROR DETECTION CODE 5 |
| 16×N+2 | SYNCHRO-NIZATION SIGNAL | NT MASTER UNIT IDENTIFICATION INFORMATION | ERROR DETECTION CODE 1 | SPACE CHANNEL INFORMATION | ERROR DETECTION CODE 2 | CONTROL CHANNEL INFORMATION | ERROR DETECTION CODE 3 | SPACE CHANNEL INFORMATION | ERROR DETECTION CODE 4 | CONTROL CHANNEL INFORMATION | ERROR DETECTION CODE 5 |
| 16×N+3 | SYNCHRO-NIZATION SIGNAL | NT MASTER UNIT IDENTIFICATION INFORMATION | ERROR DETECTION CODE 1 | CONTROL CHANNEL INFORMATION | ERROR DETECTION CODE 2 | SPACE CHANNEL INFORMATION | ERROR DETECTION CODE 3 | CONTROL CHANNEL INFORMATION | ERROR DETECTION CODE 4 | SPACE CHANNEL INFORMATION | ERROR DETECTION CODE 5 |
| 16×N+4 | SYNCHRO-NIZATION SIGNAL | NT MASTER UNIT IDENTIFICATION INFORMATION | ERROR DETECTION CODE 1 | SPACE CHANNEL INFORMATION | ERROR DETECTION CODE 2 | CONTROL CHANNEL INFORMATION | ERROR DETECTION CODE 3 | SPACE CHANNEL INFORMATION | ERROR DETECTION CODE 4 | CONTROL CHANNEL INFORMATION | ERROR DETECTION CODE 5 |
| 16×N+5 | SYNCHRO-NIZATION SIGNAL | NT MASTER UNIT IDENTIFICATION INFORMATION | ERROR DETECTION CODE 1 | CONTROL CHANNEL INFORMATION | ERROR DETECTION CODE 2 | SPACE CHANNEL INFORMATION | ERROR DETECTION CODE 3 | CONTROL CHANNEL INFORMATION | ERROR DETECTION CODE 4 | SPACE CHANNEL INFORMATION | ERROR DETECTION CODE 5 |
| 16×N+6 | SYNCHRO-NIZATION SIGNAL | NT MASTER UNIT IDENTIFICATION INFORMATION | ERROR DETECTION CODE 1 | SPACE CHANNEL INFORMATION | ERROR DETECTION CODE 2 | CONTROL CHANNEL INFORMATION | ERROR DETECTION CODE 3 | SPACE CHANNEL INFORMATION | ERROR DETECTION CODE 4 | CONTROL CHANNEL INFORMATION | ERROR DETECTION CODE 5 |
| 16×N+7 | SYNCHRO-NIZATION SIGNAL | NT MASTER UNIT IDENTIFICATION INFORMATION | ERROR DETECTION CODE 1 | CONTROL CHANNEL INFORMATION | ERROR DETECTION CODE 2 | SPACE CHANNEL INFORMATION | ERROR DETECTION CODE 3 | CONTROL CHANNEL INFORMATION | ERROR DETECTION CODE 4 | SPACE CHANNEL INFORMATION | ERROR DETECTION CODE 5 |
| 16×N+8 | SYNCHRO-NIZATION SIGNAL | OT SYSTEM INFORMATION | ERROR DETECTION CODE 1 | SPACE CHANNEL INFORMATION | ERROR DETECTION CODE 2 | CONTROL CHANNEL INFORMATION | ERROR DETECTION CODE 3 | SPACE CHANNEL INFORMATION | ERROR DETECTION CODE 4 | CONTROL CHANNEL INFORMATION | ERROR DETECTION CODE 5 |
| 16×N+9 | SYNCHRO-NIZATION SIGNAL | NT MASTER UNIT IDENTIFICATION INFORMATION | ERROR DETECTION CODE 1 | CONTROL CHANNEL INFORMATION | ERROR DETECTION CODE 2 | SPACE CHANNEL INFORMATION | ERROR DETECTION CODE 3 | CONTROL CHANNEL INFORMATION | ERROR DETECTION CODE 4 | SPACE CHANNEL INFORMATION | ERROR DETECTION CODE 5 |
| 16×N+10 | SYNCHRO-NIZATION SIGNAL | NT MASTER UNIT IDENTIFICATION INFORMATION | ERROR DETECTION CODE 1 | SPACE CHANNEL INFORMATION | ERROR DETECTION CODE 2 | CONTROL CHANNEL INFORMATION | ERROR DETECTION CODE 3 | SPACE CHANNEL INFORMATION | ERROR DETECTION CODE 4 | CONTROL CHANNEL INFORMATION | ERROR DETECTION CODE 5 |
| 16×N+11 | SYNCHRO-NIZATION SIGNAL | NT MASTER UNIT IDENTIFICATION INFORMATION | ERROR DETECTION CODE 1 | CONTROL CHANNEL INFORMATION | ERROR DETECTION CODE 2 | SPACE CHANNEL INFORMATION | ERROR DETECTION CODE 3 | CONTROL CHANNEL INFORMATION | ERROR DETECTION CODE 4 | SPACE CHANNEL INFORMATION | ERROR DETECTION CODE 5 |
| 16×N+12 | SYNCHRO-NIZATION SIGNAL | NT MASTER UNIT IDENTIFICATION INFORMATION | ERROR DETECTION CODE 1 | SPACE CHANNEL INFORMATION | ERROR DETECTION CODE 2 | CONTROL CHANNEL INFORMATION | ERROR DETECTION CODE 3 | SPACE CHANNEL INFORMATION | ERROR DETECTION CODE 4 | CONTROL CHANNEL INFORMATION | ERROR DETECTION CODE 5 |
| 16×N+13 | SYNCHRO-NIZATION SIGNAL | NT MASTER UNIT IDENTIFICATION INFORMATION | ERROR DETECTION CODE 1 | CONTROL CHANNEL INFORMATION | ERROR DETECTION CODE 2 | SPACE CHANNEL INFORMATION | ERROR DETECTION CODE 3 | CONTROL CHANNEL INFORMATION | ERROR DETECTION CODE 4 | SPACE CHANNEL INFORMATION | ERROR DETECTION CODE 5 |
| 16×N+14 | SYNCHRO-NIZATION SIGNAL | NT MASTER UNIT IDENTIFICATION INFORMATION | ERROR DETECTION CODE 1 | SPACE CHANNEL INFORMATION | ERROR DETECTION CODE 2 | CONTROL CHANNEL INFORMATION | ERROR DETECTION CODE 3 | SPACE CHANNEL INFORMATION | ERROR DETECTION CODE 4 | CONTROL CHANNEL INFORMATION | ERROR DETECTION CODE 5 |
| 16×N+15 | SYNCHRO-NIZATION SIGNAL | NT MASTER UNIT IDENTIFICATION INFORMATION | ERROR DETECTION CODE 1 | CONTROL CHANNEL INFORMATION | ERROR DETECTION CODE 2 | SPACE CHANNEL INFORMATION | ERROR DETECTION CODE 3 | CONTROL CHANNEL INFORMATION | ERROR DETECTION CODE 4 | SPACE CHANNEL INFORMATION | ERROR DETECTION CODE 5 |

FIG. 14

| SYNCHRO-NIZATION SIGNAL | CONTROL DATA 1 | ERROR DETECTION CODE 1 | CLMS1 | ERROR DETECTION CODE 2 | CLMS2 | ERROR DETECTION CODE 3 | CLMS3 | ERROR DETECTION CODE 4 | CLMS4 | ERROR DETECTION CODE 5 |

SYSTEM AND METHOD FOR POWER SAVING IN WIRELESS COMMUNICATION APPARATUS

BACKGROUND

1. Technical Field

The present invention relates to a wireless communication apparatus that is applicable to a wireless sensor.

2. Background Art

Recently, for the purpose of effective usage of frequency resources, a part of the frequency band of a digital cordless phone becomes available for wireless communication of a sound communication device, such as a wireless intercom or a wireless sensor, or a data communication device. In this frequency band, wireless communication is authorized which is on the basis of a wireless communication method of the DECT (Digital Enhanced Cordless Telecommunications) standard that has been widespread as a communication method of a digital cordless phone in countries around the world, and with a wireless communication apparatus using this frequency band, the use of a device for inexpensive, commercially available wireless communication has been enabled for a DECT type digital cordless phone. Further, from the viewpoint of effective usage of frequency resources and user convenience, there is a need for the development of complex products, such as a digital cordless phone, a wireless intercom, and a wireless sensor.

The DECT standard adopts a TDMA (Time Division Multiple Access)/TDD (Time Division Duplex) method that is configured to include 24 slots (12 slots for uplink and 12 slots for downlink) in one frame having a period of 10 ms.

FIG. 1 shows DECT type frame and slot configurations. As shown in FIG. 1, the DECT type wireless communication controls designation of a slot position by assigning numbers, such as Slot: 1, Slot: 2, and the like, for respective slots that perform wireless communication. Further, one frame includes 24 slots that are from Slot: 1 to Slot: 24, and a frame number is given for every frame to perform communication control. One slot is allocated as a control channel, and 11 slot pairs are allocated as call channels. A control signal that is transmitted through the DECT type control channel includes a synchronization signal to achieve bit synchronization and slot timing synchronization, a master unit ID to identify a master unit, a slot number to achieve slot synchronization that is used for the designation of a communication slot or the like, a frame number to achieve synchronization of a frame number that is used for concealment control or the like, and an error detection code to determine existence/nonexistence of errors of control information that includes a destination notice or the like and received data.

The control information that is transmitted to the DECT type control channel is classified into four kinds of messages: an NT message to notify of a master unit ID that is master unit identification information, a QT message to notify of system information, such as a frame number, a master unit function, a communication frequency, a standby frequency, and the like, and to be used as a reference frame for multi-frame control, a PT message to notify of information related to paging, such as call information and phone number information of a called party for calling party number notification, and an MT message to notify of information related to wireless control that is performed in a MAC layer such as startup of a communication channel and handover. Further, the DECT type cordless phone does not transmit information of the contents with each frame every time, but transmits the control information dispersed over a plurality of frames by determining a unit to assume 16 frames as one period and transmitting one kind of message by one unit. A slave unit that is a tributary station performs intermittent reception control to perform reception operation in conformity to a slot for control, to which the control information is transmitted once per 16 frames. As described above, a multi-frame control is performed to divide the control information into the kinds (the NT message, QT message, PT message, and MT message) and to transmit the plurality of frames.

Since the TDMA type wireless communication apparatus is used by mobile communication or a cordless phone that is driven by a battery, many techniques for low power consumption are disclosed. For example, JP-A-5-102900 discloses a battery saving method by intermittent reception using control channel control through spurious frame configuration and variable control of an intermittent reception period. According to the method in JP-A-5-102900, a master unit intermittently performs on/off control of the power supply of a slave unit in a manner that the master unit generates a counter set value signal that designates an on/off period of the power supply and multiplexes the counter set value signal in a time slot of each frame to transmit the multiplexed counter set value signal to the slave unit, and the slave unit loads and counts the counter set value with a counter and makes the power supply of the slave unit itself into an off state until the counter becomes a predetermined value. In addition, JP-A-5-102900 further discloses changing of the on/off period of the power supply depending on time.

JP-A-5-14458 discloses a method for suppressing the consumption of a battery of a slave unit by lengthening a carrier sense time of a control channel for searching for a master unit if there is notification of the power-off from the master unit of a cordless phone.

Further, JP-A-8-82642 discloses that switches are provided between an RF circuit, a modem modulation/demodulation circuit, and a battery, and in a period when the operations of the RF circuit and the modem modulation/demodulation circuit are unnecessary, the power supply to the corresponding blocks are cut off to reduce the power consumption.

SUMMARY

In the wireless communication apparatus in the related art, the power saving is performed in a manner that an average power consumption is reduced by changing the ratio of a reception time to an idle time, and the power consumption is reduced by intercepting the power supply to the circuits for wireless communication that are called the RF circuit and the modem modulation/demodulation circuit. However, the reduction of the power, which is consumed during an idle period when the wireless communication is unnecessary, is not performed in circuits except for the circuits for wireless communication, that is, in circuit blocks that are necessary to control the wireless communication apparatus, such as a CPU, a ROM, a RAM, and an oscillating circuit. Because of this, if the slave unit moves out of the coverage of the master unit and an operation to repeat continuous reception and idling for searching for the master unit is continuously performed, the power consumption which occurs during the idling time cannot be bypassed even if the ratio of the reception time to the idling time is lowered, and this disturbs the low power consumption.

The present invention has been made in view of such situations, and an object of the present invention is to provide a wireless communication apparatus with low power consumption, which realizes reduction of power consumption in a wireless idle period.

A wireless communication apparatus according to an aspect of the invention includes: a power switch unit that switches a power supplied from a battery; a power supply control unit that controls an on/off operation of the power switch unit; a timer unit that measures a time period depending on a given setting through a power supplied from the battery and outputs a trigger for turning on a power supply to the power supply control unit at a time of expiration of the time period; a wireless unit that receives the power supplied through the power switch unit and performs a wireless communication with a different wireless communication apparatus; and a control unit that receives the power supplied through the switch unit. The power supply control unit is configured to turn on the power switch unit upon receiving the trigger for turning on the power supply and to turn off the power switch unit upon receiving a trigger for turning off the power supply.

When the wireless unit and the control unit are supplied with the power through the power switch unit in accordance with the trigger for turning on the power supply, the control unit controls the wireless unit to receive a wireless signal from the different wireless communication apparatus. The control unit then sets a given value of the expiration of the time period in the timer unit and outputs the trigger for turning off the power supply to the power supply control unit.

According to the present invention, current consumption can be reduced when the wireless communication apparatus is unable to receive a wireless signal transmitted from a control station.

BRIEF DESCRIPTION OF THE DRAWINGS

FIG. 6 is a diagram illustrating a data format of a control signal in the case where only a phone slave unit is registered in a master unit illustrated in FIG. 2.

FIG. 7 is a diagram illustrating a data format of a control signal in the case where a sensor slave unit is registered in a master unit illustrated in FIG. 2.

FIG. 8 is a diagram illustrating the kinds and transmission order of control signals in the case where only a phone slave unit is registered in a master unit illustrated in FIG. 2.

FIG. 10 is a diagram illustrating the operation in which a phone slave unit illustrated in FIG. 2 establishes synchronization of frames and slots together with a master unit.

FIG. 11 is a diagram illustrating the kinds and transmission order of control signals in the case where a sensor slave unit is registered in a master unit illustrated in FIG. 2.

FIG. 14 is a diagram illustrating a data format of a signal that is used in the case where a master unit and a sensor slave unit illustrated in FIG. 2 communicate with each other.

DETAILED DESCRIPTION

Figure 1:
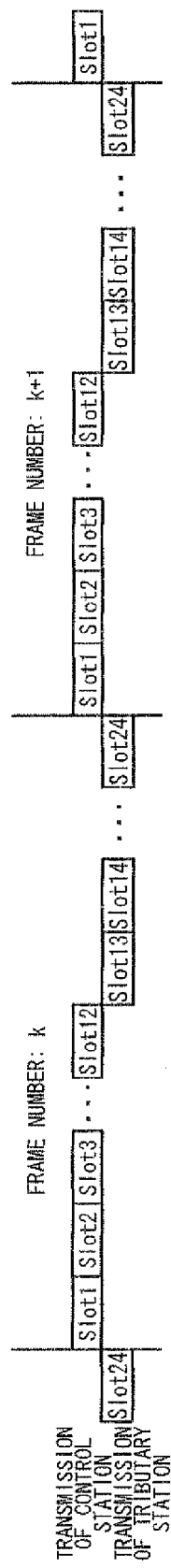
FIG. 1 is a diagram illustrating frame and slot configurations in a DECT standard.

A first aspect of the present invention provides a wireless communication apparatus, including: a power switch unit that switches a power supplied from a battery; a power supply control unit that controls an on/off operation of the power switch unit; a timer unit that measures a time period depending on a given setting through a power supplied from the battery and outputs a trigger for turning on a power supply to the power supply control unit at a time of expiration of the time period; a wireless unit that receives the power supplied through the power switch unit and performs a wireless communication with a different wireless communication apparatus; and a control unit that receives the power supplied through the switch unit, wherein the power supply control unit is configured to turn on the power switch unit upon receiving the trigger for turning on the power supply and to turn off the power switch unit upon receiving a trigger for turning off the power supply, and when the wireless unit and the control unit are supplied with the power through the power switch unit in accordance with the trigger for turning on the power supply, the control unit controls the wireless unit to receive a wireless signal from the different wireless communication apparatus, and the control unit then sets a given value of the expiration of the time period in the timer unit and outputs the trigger for turning off the power supply to the power supply control unit.

According to the first aspect of the present invention, the timer unit, to which the power is supplied from the battery at all times, measures time and supplies the power supply of the control unit at the time of expiration, and the wireless unit is operated to receive the wireless signal from other wireless communication apparatuses. Accordingly, the power consumption is greatly reduced other than the time when the wireless unit is operated by the timer unit, and thus it becomes possible to suppress the consumption of the battery. For example, in the wireless communication apparatus in which the control unit includes the CPU, ROM, RAM, and EEPROM, standby current flows to these devices even in a state where the CPU is stopped to remove the access to the ROM, RAM, and EEPROM, and the power is consumed. However, according to the above aspect, the power supply to these apparatuses is intercepted during the idle period, and thus the low power consumption becomes possible.

A second aspect of the present invention provides a wireless communication apparatus in addition to the first aspect, further including a state memory unit that receives a power supplied from the battery at all times and stores an operating state of the wireless communication apparatus therein, wherein the control unit is configured to write information that indicates an out-of-service state in the state memory unit when the wireless signal that is transmitted from the different wireless communication apparatus is unable to be received, and to write information that indicates an in-service state in the state memory unit when the wireless signal that is transmitted from the different wireless communication apparatus is able to be received, and while the control unit is supplied with the power through the power switch unit, the control unit performs a searching operation for searching for the wireless signal that is transmitted from the different wireless communication apparatus when the information that indicates the out-of-service state is stored in the state memory unit, but performs an intermittent reception operation for intermittently receiving the wireless signal that is transmitted from the different wireless communication apparatus in a predetermined cycle when the information that indicates the in-service state is stored in the state memory unit.

According to the second aspect of the present invention, when the power is supplied to the control unit, the control unit performs a search operation (so-called open search operation) for the signal of the different wireless communication apparatus only in the case where the information that indicates the out-of-service state is stored in the state memory unit, and if the information that indicates the in-service state is stored in the state memory unit, that is, in the case of the in-service state last time, the search is completed without the power consumption required for the open search operation, and thus low power consumption becomes possible. Since the intermittent reception is performed even in the case where the information stored in the state memory unit indicates the in-service state, the wireless signal transmitted from the different wireless communication apparatus is received through supply of the power to the control unit to match the reception timing of the intermittent reception. Accordingly, the power, which is consumed by the control unit and the wireless unit in a period when the reception of the wireless signal is unnecessary during the intermittent reception, is not consumed, and thus it is possible to suppress the consumption of the battery.

A third aspect of the present invention provides a wireless communication apparatus in addition the above aspects, wherein when the state where the wireless signal from the different wireless communication apparatus is unable to be normally received continues and thus power-off and an operation of searching for the wireless signal of the different wireless communication apparatus are repeated, the control unit changes the setting of the timer unit to increase a rate of power-off time in a ratio of the power-off time to time to search for the wireless signal that is transmitted from the different wireless communication apparatus.

According to the third aspect of the present invention, if the state where the wireless signal that is transmitted from the different wireless communication apparatus is unable to be received continues and thus the power-off and the operation of searching for the wireless signal transmitted from the different wireless communication apparatus are repeated, the low power consumption becomes possible in the state where the wireless signal transmitted from the other wireless communication apparatus is unable to be received continues through increasing of the time ratio of the power-off that requires low power consumption.

A fourth aspect of the present invention provides a wireless communication apparatus in addition the above aspects, further including a memory unit for storing the number of failures therein, to be stored when reception of the wireless signal of the different wireless communication apparatus fails consecutively, wherein when the reception of the wireless signal that is transmitted from the different wireless communication apparatus fails multiple times, the control unit increments the number of failures in the memory unit and sets the value of the expiration of the time period in the timer unit depending on the number of failures stored in the memory unit.

According to the fourth aspect of the present invention, if the reception of the wireless signal fails consecutively or if the failure frequency is high, the signal reception strength from the different wireless communication apparatus may be poor in many cases, and if the operation (so-called open search operation) to search for the signal of the different wireless communication apparatus is frequently performed whenever the reception fails, unnecessary power consumption may occur. Accordingly, by setting an expiration value in the timer unit depending on the situation, the off-time is lengthened through lengthening of the time until the expiration of the timer unit depending on the situation, and thus the consumption of the battery can be prevented.

A fifth aspect of the present invention provides a wireless communication apparatus in addition the above aspects, further including: a first clock unit that receives a power supplied from the battery at all times; and a second clock unit that receives the power supplied through the switch unit, wherein the timer unit measures a time period by counting clocks generated by the first dock unit, and the control unit operates with clocks generated by the second clock unit.

According to the fifth aspect of the present invention, since the first clock unit that generates the clocks that are necessary to measure the time period through the timer unit is independently provided, it is possible to use the clocks having low frequency as the clocks that the timer unit use for the time measurement without affecting the wireless operation or the specification of the control unit, and thus the power consumption of the timer unit can be reduced. Further, since the power consumption of the first clock unit can be reduced through providing of one clock supplier in the first clock unit, the low power consumption in the idle period can be achieved.

First Embodiment

A wireless communication apparatus according to a first embodiment of the present invention will be described based on the drawings with reference to a wireless phone and a wireless sensor for notifying of door opening/closing as an example.

Figure 2:
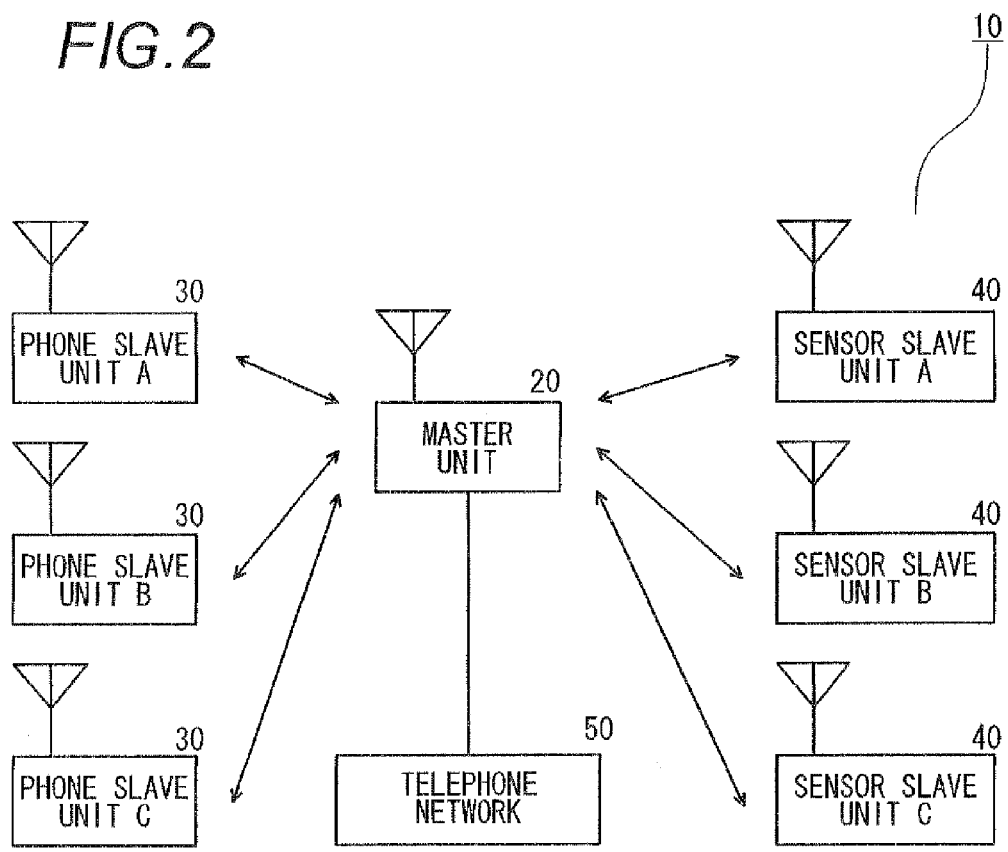
FIG. 2 is a diagram illustrating a wireless communication apparatus according to a first embodiment of the present invention.

In FIG. 2, a wireless communication apparatus 10 includes one master unit 20 connected to a telephone network 50, three phone slave units 30 (A to C), and sensor slave units 40 (A to C) having functions as sensors for detecting opening and closing of a window. The master unit 20, the phone slave unit 30, and the sensor slave unit 40 communicate with one another in a DECT standard. As shown in FIG. 1, the DECT standard performs communication in a TDMA/TDD method that is configured to include 24 slots (12 slots for uplink and 12 slots for downlink) in one frame having a period of 10 ms.

Further, a control channel slot of at least one slot is allocated in one frame. This control channel and call channels are also transmitted and received in the frame period of 10 ms. Further, respective frequencies/slot positions are optional, and as for the frequencies, all five frequencies are used.

Figure 3:
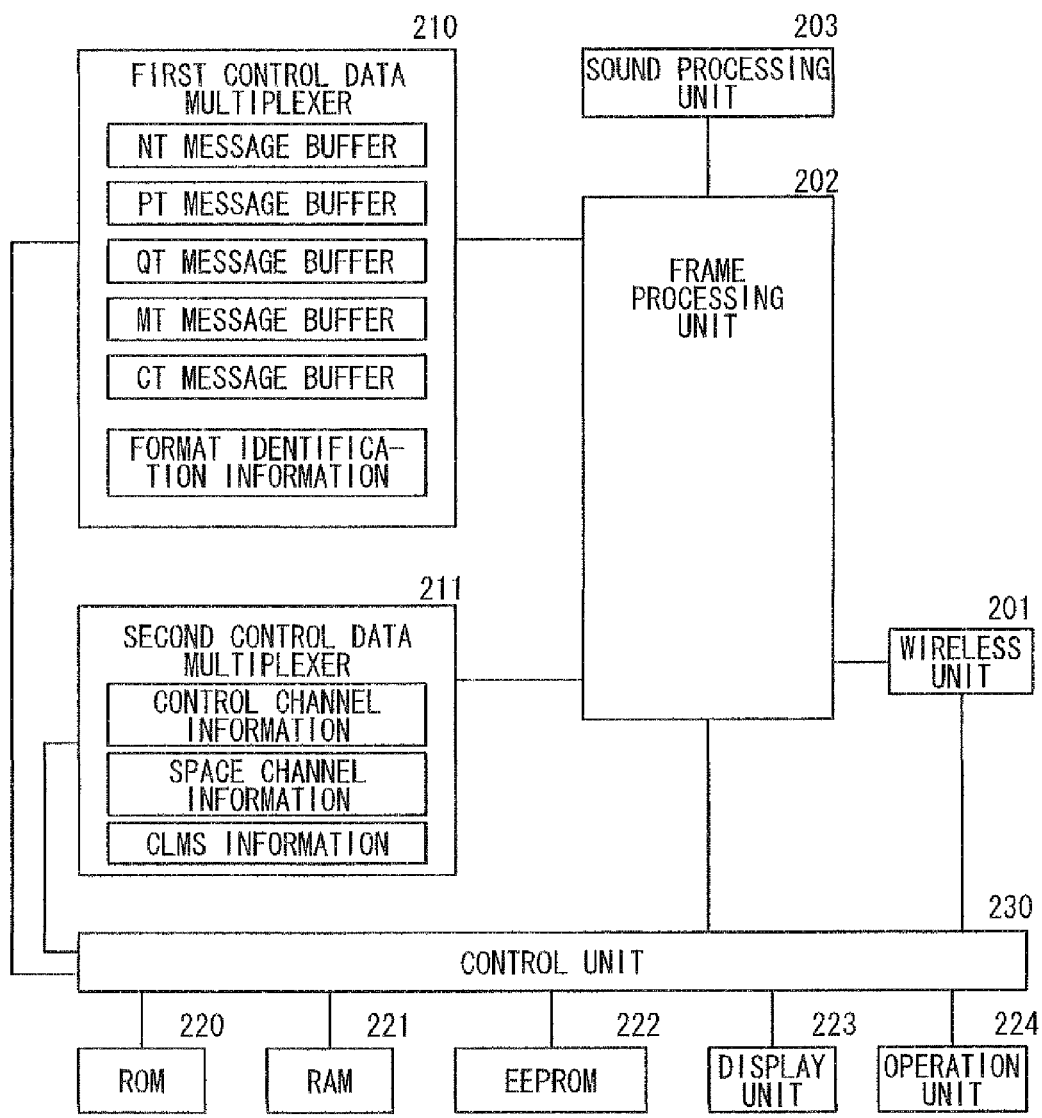
FIG. 3 is a block diagram illustrating the configuration of a master unit illustrated in FIG. 2.

Next, the master unit 20 will be described on the basis of FIG. 3. The master unit 20 includes a wireless unit 201 performing DECT type wireless communication, a frame processing unit 202 transmitting transmission data such as control data or sound data to match the timing for TDMA communication and extracting the data from the reception data to match the timing for the TDMA communication, and a sound processing unit 203 converting the received sound data into an analog sound signal and converting the analog sound signal into digital sound data for transmission.

The master unit 20 further includes a first control data multiplexer 210 managing the transmission order of the control data that is transmitted in an initial control data region of a control signal, and a second control data multiplexer 211 managing the transmission order of the control data that is transmitted in the following control data region.

The master unit 20 further includes a ROM 220 into which programs for controlling the master unit 20 are stored, and a RAM 221 for executing the programs. Further, the master unit 20 includes an EEPROM 222 in which the contents do not disappear even in the power off state and which can rewrite the contents in a specified method, a display unit 223 displaying the operating state or the like, an operation unit 224 performing an input to instruct the operating to the master unit 20, and a control unit 230 controlling the whole master unit 20.

Figure 4:
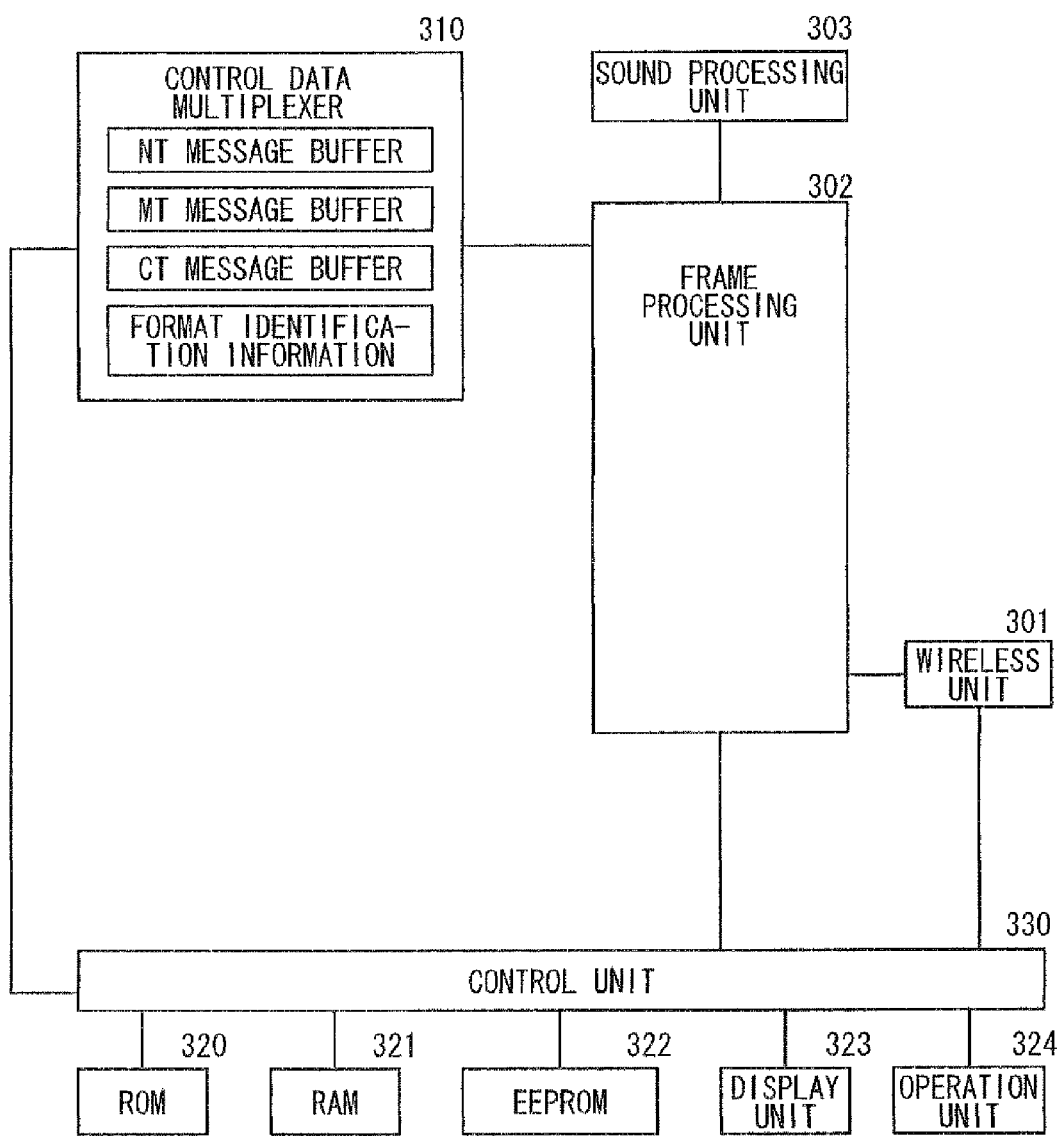
FIG. 4 is a block diagram illustrating the configuration of a phone slave unit illustrated in FIG. 2.

Next, the phone slave unit 30 will be described on the basis of FIG. 4. The phone slave unit 30 includes a wireless unit 301 performing DECT type wireless communication, a frame processing unit 302 transmitting transmission data such as control data or sound data to match the timing for TDMA communication and extracting the data from the reception data to match the timing for the TDMA communication, and a sound processing unit 303 converting the received sound data into an analog sound signal and converting the analog sound signal into digital sound data for transmission.

The phone slave unit 30 further includes a control data multiplexer 310 managing the transmission order of the control data that is transmitted in an initial control data region of the control signal, a ROM 320 into which programs for control are stored, and a RAM 321 for executing the programs. Further, the phone slave unit 30 includes an EEPROM 322 in which the contents do not disappear even in the power off state and the contents can be rewritten in a specified method, a display unit 323 displaying the operating state or the like, an operation unit 324 performing an input to instruct the operating, and a control unit 330 controlling the whole phone slave unit 30. Further, although the phone slave unit 30 is driven by a chargeable battery, the description of the battery or a function block to supply the power from the battery will not be repeated.

Figure 5:
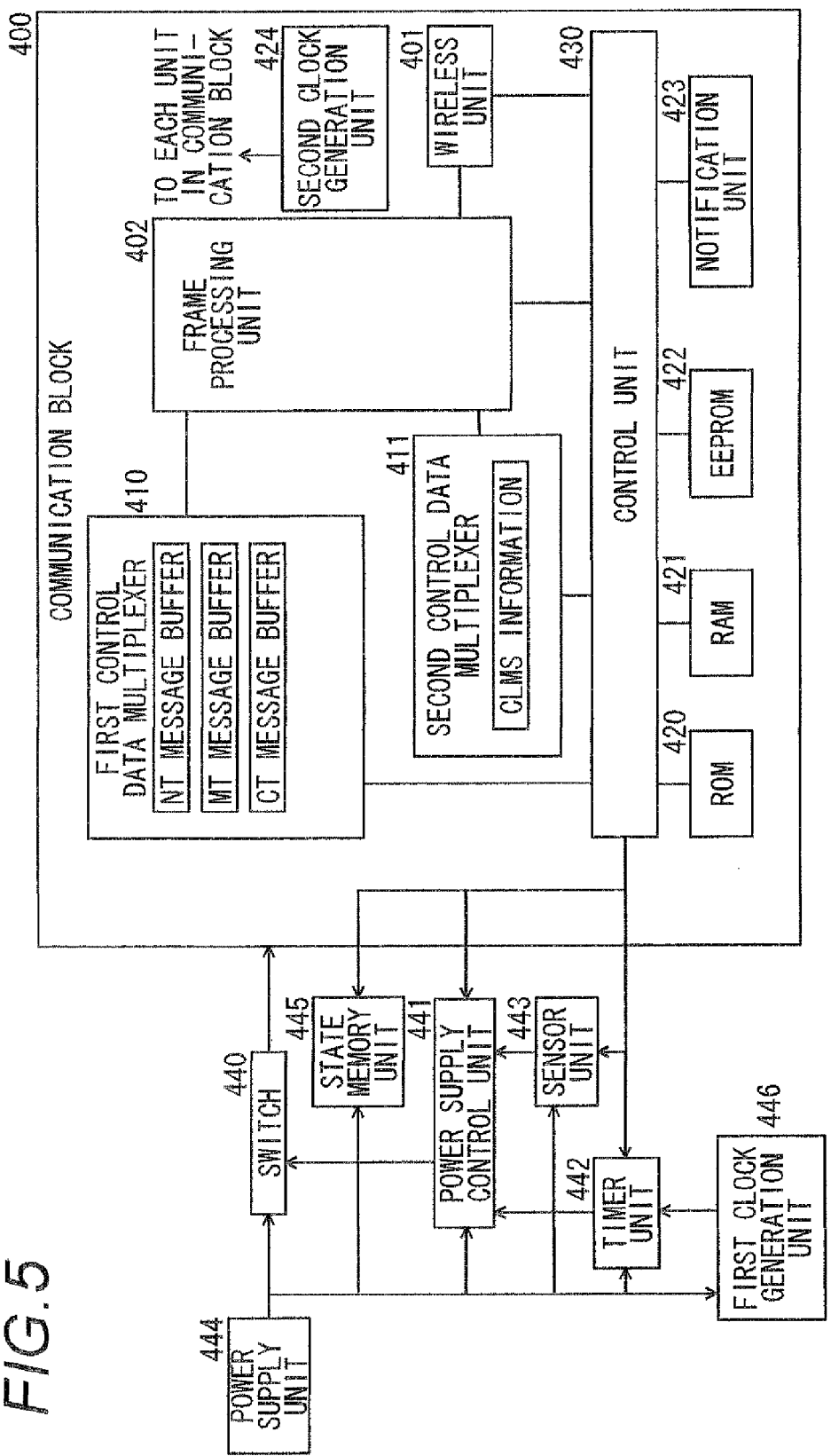
FIG. 5 is a block diagram illustrating the configuration of a sensor slave unit illustrated in FIG. 2.

Next, the sensor slave unit 40 that senses opening and closing of a window and transmits a signal to the master unit 20 will be described on the basis of FIG. 5. The sensor slave unit 40 includes a wireless unit 401 performing the DECT type wireless communication. The sensor slave unit 40 further includes a frame processing unit 402 transmitting transmission data such as control data or sensor detection information to the master unit 20 to match the timing for the TDMA communication and extracting the data from the reception data received from the master unit 20 to match the timing for the TDMA communication.

The sensor slave unit 40 further includes a first control data multiplexer 410 managing the transmission order of the control data that is transmitted to the initial control data region of the control signal, and a second control data multiplexer 411 managing the transmission order of the control data that is transmitted to the following control data region.

Further, the sensor slave unit 40 includes a ROM 420 into which programs for control are stored, a RAM 421 for executing the programs, an EEPROM 422 in which the contents do not disappear even in the power off state and the contents can be rewritten in a specified method, and a notification unit 423 outputting a notification sound to notify that a window is in an open state in the neighborhood if the window is opened in a state where a caution mode is set. Further, the sensor slave unit 40 includes a second clock generation unit 424 that generates a clock that is necessary for wireless communication by the wireless unit 401 and a clock that is necessary for the operation of the sensor slave unit 40 in the start state thereof. Further, the sensor slave unit 40 includes a control unit 330 which operates by the clock generated by the second clock generation unit 424 and controls the whole sensor slave unit 40.

Further, the sensor slave unit 40 includes a switch 440 turning on/off the power supply to a communication block 400 and a power supply control unit 441 generating a power supply control switching signal. Further, the sensor slave unit 40 includes a tinier unit 442 measuring timing of power-on. This timer unit 442 generates a power-on signal when a predetermined time elapses. Further, the timer unit 442 measures the timing of a notification retry when notifying the master unit of sensor state information or the time of power-on when regularly notifying the master unit of the measurement value of battery voltage or the like. Further, the sensor slave unit 40 includes a sensor unit 443 detecting the opening and closing of the window and generating a power-on signal, a power supply unit 444 supplying the power to each unit of the sensor slave unit 40 by the power of the battery, and a state memory unit 445 that is always operable by the battery. Further, the sensor slave unit 40 includes a first clock generation unit 446 generating a clock for driving the timer unit 442.

Since the sensor state information has high emergency, if there is no reply from the master unit 20 after the sensor state is transmitted thereto and the normal reception in the master unit 20 is unable to be confirmed, the notification retry is performed multiple times at the frequency of once in several seconds afterwards. By contrast, information on the battery voltage has lower emergency than the notification of the sensor state, and thus continuous reception is not performed even if normal reception of the master unit 20 is unable to be confirmed. However, the information on the battery voltage is transferred to the master unit 20 while communication with the master unit 20 is performed regularly (at the frequency of once in several minutes) every predetermined time.

In both of the notification retry of the sensor state information and regular communication for transferring the information on the battery voltage, power supply to the communication block 400 is cut off between communication and communication, and at this time, the timer unit 442 counts the clock generated by the first clock generation unit 446. When the timer unit 442 reaches a predetermined count value, it notifies the power supply control unit 441 of the count expiration, and the power supply control unit 441 turns on the power supply to the communication block 400, so that the sensor slave unit 40 starts communication with the master unit 20.

Further, by performing setting so that the timer unit 442 performs counting in slow pace between communication and communication through reduction of the clock frequency of the first clock generation unit 446, it becomes possible to reduce the power consumption. For this, it is necessary to set the clock frequency of the second clock generation unit 424 to an appropriately high level in order to perform highly precise count about the communication.

A block that includes the wireless unit 401, the frame processing unit 402, the first control data multiplexer 410, the second control data multiplexer 411, the ROM 420, the RAM 421, the EEPROM 422, the notification unit 423, and the second clock generation unit 424 of the sensor slave unit 40, and the control unit 330 may be called the communication block 400. The power is supplied to the respective units of the communication block 400 through a switch 440, and if the switch 440 is in an off state, the power supply is intercepted.

Next, the operation of the wireless communication apparatus 10 according to the first embodiment will be described. First, the operation in an idle state of the slave unit will be described. The master unit 20, which operates as the control station of the wireless communication apparatus 10, transmits a control, signal using one of transmission slots of the control station from Slot: 1 to Slot: 12 of one frame (duration: 10 msec) as a control channel illustrated in FIG. 1. That is, the control signal is transmitted once for one frame, in the cycle of 10 msec. The control signal includes self-identification information, a frame number and a slot number to take the synchronization with the frame and slot, standby information, and a message which is transmitted to the phone slave unit that is used to notify of the receipt from a phone channel. Further, in the case where the sensor slave unit 40 has been registered, a message, which is transmitted to the sensor slave unit used for the case where the master unit 20 notifies of the change of the operating state of the sensor slave unit, may be included in the control signal.

The message that is transmitted from the master unit 20 to the phone slave unit 30 is transmitted, once for 16 frames, in a slot that is set for the control signal of the frames (hereinafter described as "control slot"). The phone slave unit 30 in the idle state performs intermittent reception that performs reception operation at the timing to match the transmission period of the message to the phone slave unit, and acquires the message, which is transmitted to the phone slave unit, of the control signal that is received during the intermittent reception.

The sensor slave unit 40 operates to supply the power to the communication block 400 to match the transmission period of the message to the sensor slave unit, and starts the reception operation to search for the control signal. The sensor slave unit 40 receives the control signal that is transmitted from the master unit 20 during the reception period, and operates to acquire the message to the sensor slave unit that is used to notify of the change of the operating state of the sensor slave unit of the control signal. After the reception of the message to the sensor slave unit is completed, the sensor slave unit 40 intercepts the power supply to the communication block 400. The sensor slave unit 40 performs the reception operation to match the transmission period of the message to the sensor slave unit, and further performs the intermittent reception to intercept the power supply to the communication block 400.

FIG. 6 illustrates the format of the control signal that is transmitted from the master unit 20 in the case where only the phone slave unit 30 is registered in the master unit 20. Further, FIG. 7 illustrates the format of the control signal that is transmitted from the master unit 20 in the case where the sensor slave unit 40 is registered in the master unit 20.

In FIGS. 6 and 7, the synchronization signal of the head part includes data to take the synchronization of the bit timing and data to take the synchronization of the bit position in the slot. Control data 1 is control data that is output to the first control data multiplexer 210, and error detection code 1 is a code to detect reception error of the control data 1. If the slave unit that is registered in the master unit 20 is only the phone slave unit 30 and the sensor slave unit 40 is not registered, it is assumed that the amount of data that is once transmitted by the control signal is the amount of data that can be transmitted as one control data 1, and if the control signal once transmitted is insufficient, the transmission is performed using the control signal multiple times.

In FIG. 7, control data 2, control data 3, control data 4, and control data 5 are control data output to the second control data multiplexer 211, and error detection code 2, error detection code 3, error detection code 4, and error detection code 5 are codes to detect reception errors of the preceding control data 2, control data 3, control data 4, and control data 5. In the case where the sensor slave unit 40 is registered in the master unit 20 as described above, in addition to the control data 1 and the error detection code 1 illustrated in FIG. 6, all the information necessary as possible for the control signal once transmitted can be transmitted by increasing the amount of data transmitted by the control signal once transmitted using a format in which the control data 2, control data 3, control data 4, control data 5, and the respective error detection codes.

Further, the region of the control data 1 in FIGS. 6 and 7 includes the region in which format identification information of the data that is transmitted to the corresponding Slot is transmitted and received. The format identification information that is transmitted to the control data 1 is information for identifying, for example, whether or not the data of the corresponding slot is composed of any format illustrated in FIG. 6, 7, or 9, whether or not the information in the control data 2, control data 3, control data 4, and control data 5 indicates the synchronization for the TDMA communication or the operating state of the master unit in the case where the transmission is performed with the format of FIG. 7, or whether or not the corresponding information is a message for message communication between applications.

FIG. 8 is a diagram illustrating the kinds and transmission order of control signals that are transmitted with the format illustrated in FIG. 6 by the master unit 20 in the case where only the phone slave unit 30 is registered in the master unit 20. Here, an example of multi-frame control that transmits various kinds of control signals to assume 16 frames as one period. As shown in FIG. 8, the master unit 20 transmits a PT message to notify of information related to paging, such as call information and phone number information of a called party for calling party number notification, in a frame having a frame number that is 16 integral multiples, a QT message to notify of system information, such as a frame number, a master unit function, a communication frequency, a standby frequency, and the like, in a frame having a frame number that is (16 integral multiples+8) and to be used as a reference frame for multiframe control, and an NT message to notify of a mater ID that is the master unit identification information in a frame having other frame numbers.

Next, the operation to transmit the control signal in the case where only the phone slave unit 30 is registered in the master unit 20 will be described with reference to FIGS. 8 and 3. The control unit 230 of the master unit 20 stores information on a slave unit that is registered in the EEPROM 222. That is, if the registration of the slave unit is performed, the master unit 20 stores a slave unit ID for identifying the slave unit and slave unit classification identification information for identifying whether the slave unit is a phone slave unit 30 or a sensor slave unit 40. If the registered slave unit is the phone slave unit 30 only, the control unit 230 controls the frame processing unit 202 and the wireless unit 201 to transmit the control signal illustrated in FIG. 8. That is, the control unit 230 selects one of Slot: 1 to Slot: 12 for transmission to be used for transmission of the control signal, selects one frequency from predetermined frequencies, and controls the transmission unit of the wireless unit 201 to transmit the control signal with the format illustrated in FIG. 6 with the selected slot and frequency (hereinafter, the slot selected by the control unit 230 of the master unit 20 for transmission of the control signal is called a "control slot").

The control unit 230 controls to write the master unit ID thereof in an NT message buffer of the first control data multiplexer 210, to write call information depending on event occurrence such as call reception and phone number information of a called party for calling party number notification in a PT message buffer, and to write in order a frame number of each of 16 frames, a master unit function, a slot number, and a control signal to notify of system information, such as a usage frequency and a standby frequency, in a QT message buffer.

The first control data multiplexer 210 outputs the data of the PT message buffer to the frame processing unit 202 if the frame number becomes 16 integral multiples, and outputs the data of the QT message buffer to the frame processing unit 202 if the frame number becomes (16 integral multiples+8). In the case of other frame numbers, that is, if the frame number is neither 16 integral multiples nor (16 integral multiples+8), the first control data, multiplexer 210 outputs the data of the NT message buffer to the frame processing unit 202.

The frame processing unit 202 generates a transmission data stream by filling the region of the control data 1 with the data being transmitted to the region of the control data 1, depending on the data output from the first control data multiplexer 210 and the format identification information indicating that the data is configured in the format of FIG. 6, generates error detection code 1 depending on the transmitted data in the region of the control data 1, and outputs the data stream to the wireless unit 201 in the order of the synchronization signal, the control data 1, and the error detection code 1 with the format of FIG. 6 to match the timing of the control slot.

Figure 9:
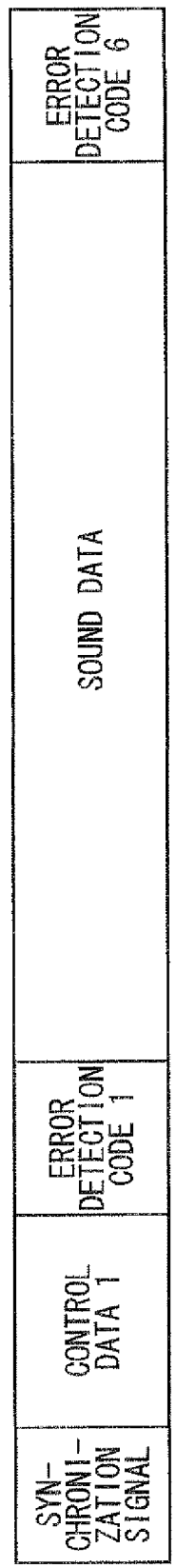
FIG. 9 is a diagram illustrating a data format of a signal that is used in the case where a master unit and a phone slave unit illustrated in FIG. 2 communicate with each other.

Next, the reception operation of the master unit 20 and the data.

format at the time of sound communication between the master unit 20 and the phone slave unit 30 will be described. FIG. 9 illustrates a data format in the case where the master unit 20 and the phone slave unit 30 perform a voice call with each other. In FIG. 9, in the region of control data 1, a region to transmit the format identification information indicating that the data is configured in the format of FIG. 9 and a region to transmit a control message for voice call start are installed. This control message region is used for the communication of the MT message to start a communication channel, the NT message to notify of the master ID, and the CT message to notify of a negotiation message of a higher layer such as a network layer or the like. The error detection code 1 is a region of an error detection code to detect the reception error of the control data 1.

Sound data in the format illustrated in FIG. 9 is, for example, a region of sound data that is obtained by encoding the analog sound signal in a G.726 method, and the error detection code 6 is a region of an error detection code to detect the reception error of the region of the sound data.

The master unit 20 operates to receive a wireless signal of a call start demand, which is always transmitted with the format of FIG. 9 from the phone slave unit 30, through 11 Slots except for a slot that is apart for 12 slots from the control slot among 12 slots which are from Slot: 13 to Slot: 24 (hereinafter, a slot in which the call start demand is in a standby state is called a "standby slot"). For example, if the slot that transmits the control signal is Slot: 1, the wireless signal that is transmitted from the phone slave unit 30 is received through 11 slots that are from Slot: 14 to Slot: 24, except for Slot: 13 that is apart for 12 slots from Slot: 1.

Since the reception is performed through the standby slot, the control unit 230 of the master unit 20 controls the reception frequency of the reception unit of the wireless unit 201. The reception frequency in the standby slot is sequentially changed from the small frequency number of the use frequency of which there is notification from the system information of the QT message of the control signal for each frame. Further, the standby frequency of which there is notification from the system information of the QT message is information to notify of the reception frequency in the standby slot of the frame that transmits the QT message.

The reception data received in the wireless unit 201 is output to the frame processing unit 202. The frame processing unit 202 operates to extract the data stream of the region of the control data 1 and the error detection code 1 illustrated in FIG. 6 from the reception data of each slot, to determine whether or not the data of the region of the control data 1 is correct, data using the data received in the region of the error detection code 1, and to notify the control unit 230 of the data of the region of the control data 1 if the data is correct data.

Next, the operation of the phone slave unit 30 until the phone slave unit 30 shifts to an idle state after the power-on will be described. If the power is supplied to the phone slave unit 30, the phone slave unit 30 operates to search for the control signal that is transmitted from the master unit 20 which is the master unit of the phone slave unit 30 (hereinafter described as a "master search operation"). Then, if the control signal that is transmitted from the master unit 20 is detected, the phone slave unit 30 collects various kinds of information transmitted in the QT message of the control signal, and performs an operation to take frame and slot synchronization with the master unit based on the information to be in a communicable state (hereinafter described as "frame and slot synchronization operation").

FIG. 10 illustrates the operation in which the phone slave unit 30 establishes frame and slot synchronization with the master unit 20. In FIG. 10, if the operation for synchronization starts, a consecutive reception for searching for the master unit, that is, an open search starts. If the synchronization signal illustrated in FIG. 6 is detected from the reception data, the phone slave unit 30 detects the control signal that is transmitted from the master unit itself by extracting the data stream of the region of the control data 1 and the error detection code 1 from the following reception data and determining whether or not the NT message to notify of the master unit ID of the master unit itself exists. FIG. 10 illustrates an example in the case where the message that is initially received after the open search start is the PT message. In this case, the phone slave unit 30 stops and changes the consecutive reception to the reception of the cycle of 10 msec, and receives the following control signal after 10 msec. During the reception after 10 msec, the phone slave unit 30 receives the NT message, and if it is recognized that the signal being received is the control signal that is transmitted from the master unit itself, the phone slave unit 30 changes the search operation from the master unit search operation to the frame and slot synchronization operation.

In the frame and slot synchronization operation, the phone slave unit 30 collects various kinds of information transmitted by a plurality of QT messages through continuous reception of the cycle of 10 msec, and if necessary information gathers, the phone slave unit 30 is in a frame and slot synchronization state where communication with the master unit becomes possible. Thereafter, the phone slave unit 30 becomes an idle state in which the phone slave unit 30 performs reception to match the timing of the PT message that is transmitted in the cycle of 160 msec.

Next, the operation of the respective units of the phone slave unit 30 until the phone slave unit 30 shifts to the idle state after the power-on will be described with reference to FIG. 4. If the power is turned on, the control unit 330 starts its operation. The control unit 330 controls the wireless unit 301 to perform the consecutive reception operation with a predetermined frequency. The reception data received in the wireless unit 301 is output to the frame processing unit 302. The frame processing unit 302 searches for the synchronization signal illustrated in FIG. 6 from the reception data, extracts the data stream of the region of the following control data 1 and error detection code 1, and determines whether or not the data of the region of the control data 1 is correct data using the data received in the region of the error detection code 1. If the data is correct data, the frame processing unit 302 operates to notify the control unit 330 of the data of the region of the control data 1.

If there is notification of the control data, the control unit 330 of the phone slave unit 30 controls the wireless unit 301 to stop and change the consecutive reception to the reception of the cycle of 10 msec. Then, the control unit 330 determines whether or not the search operation is changed from the slave unit search operation to the frame and slot synchronization operation by determining whether or not the received signal is the data transmitted from the master unit itself through comparison of the reception data with the master unit ID of the phone slave unit 30 stored in the EEPROM 322. Further, if the received data, is other than the NT message, the control unit 330 determines whether or not the signal received on the basis of the data received by the reception of the cycle of 10 msec thereafter is the data transmitted from the master unit itself.

If the received data is the data transmitted from the master unit itself, the control unit 330 continues the reception of the cycle of 10 msec to perform the frame and slot synchronization operation. If the received data is not the data transmitted from the master unit itself, the control unit 330 restarts the open search to start the search for the next master unit. Further, if the control signal of the master unit itself is unable to be received although the master unit search operation is performed for a predetermined time or for a predetermined number of times with one frequency during the open search, the control unit 330 controls the wireless unit 301 to perform the consecutive reception operation by changing the reception frequency.

The control unit 330 of the phone slave unit 30 establishes the synchronization of the frame number and the slot number with the master unit 20 through reception of the frame number and the system information of the QT message after performing the frame and slot synchronization operation, and recognizes the setting order of the reception frequency of the standby slot of the master unit. If there is notification of all the necessary information through the control signal and the necessary information is received, the control unit 330 starts control to shift to the idle state in which the reception is performed in the cycle of 160 msec. That is, the control unit 330 shifts the control to start the reception of the wireless unit 301 to match the timing of the PT message that is transmitted with the frame number of 16 multiples.

Next, the call operation of the phone slave unit 30 to the master unit 20 will be described as an example of the operation when an event of an outside call reception occurs. If the event of the outside call reception occurs, the control unit 230 of the master unit 20 writes the PT message that notifies of the outside call reception (hereinafter described as an "outside call reception message") in the PT message buffer of the first control data multiplexer 210. The outside call reception message is output to the wireless unit 201 at the timing when the frame number is of 16 multiples, and is transmitted as the control signal, being put in the region of the control data 1 illustrated in FIG. 6.

On the other hand, the wireless unit 301 of the phone slave unit 30 performs the reception at the timing when the frame number is of 16 multiples in the idle state, and the outside call reception message that is transmitted to be put on the control signal from the master unit 20 is received in the wireless unit 301 and is output to the frame processing unit 202. The frame processing unit 202 extracts the outside call reception message from the region of the control data 1 illustrated in FIG. 6, and outputs the extracted outside call reception message to the control unit 330.

If the outside call reception message is received, the control unit 330 of the phone slave unit 30 performs control to notify a user of the outside call reception by making a ringer sound rumble in the display unit 323. Then, if a user's operation to respond to the reception is performed in the operation unit 324, the control unit 330 selects one slot of the standby slots that is used to transmit the message from the slave unit through the following communication, and selects the "frequency for communication" to be used in the following communication. Hereinafter, the slot selected to transmit the message from the slave unit is described as a "slave transmission slot for communication" (or a master unit reception slot for communication). Further, the control unit 330 selects the slot that is apart for 12 slots from the selected slave unit transmission slot for communication as the slot that is used for reception in the slave unit through the following communication. Hereinafter, the slot selected for reception in the slave unit is described as the "slave reception slot for communication" (or a master unit transmission slot for communication).

In order to confirm whether or not the slave unit reception slot for communication and the slave unit transmission slot for communication can be used without interference, the control unit 330 sets the wireless unit 301 to receive the frequency for communication through the slots, and performs carrier sense of the slave unit transmission slot for communication and the slave unit reception slot for communication.

If the reception level of interfering waves of the slot is equal to or lower than a threshold value stored in the EEPROM 322, the control unit 330 of the phone slave unit 30 determines that the slot is available, and shifts to an operation to transmit a message for starting the communication channel. (hereinafter described as a "wireless link establishment demand message"). That is, the control unit 330 writes the wireless link establishment demand message in the MT message buffer of the control data multiplexer 310, and controls the wireless unit 301 to perform the transmission with the above-described frequency for communication using the slot so that the master unit 20 matches the standby slot with the frequency that coincides with the frequency for this time communication. At this time, the communication between the phone slave unit 30 and the master unit 20 is performed using the format of FIG. 9 as described above. The frame processing unit 302 puts the MT message that includes the wireless link establishment demand message in the region of the control data 1 with the format illustrated in FIG. 9, puts the sound data output from the sound processing unit 303 in the region of sound data, calculates and puts respective error detection codes in the region of the error detection code 1 to output to the wireless unit 301. The wireless unit 301 operates to transmit the wireless signal that includes the above-described data.

The wireless signal including the wireless link establishment demand message that is transmitted from the phone slave unit 30 is received in the wireless unit 201 of the master unit 20 and is output to the frame processing unit 202. The frame processing unit 202 extracts the wireless link establishment demand message and notifies the control unit 230 of the extracted wireless link establishment demand message.

If the wireless link establishment demand message is received, the control unit 230 of the master unit 20 starts to control the sound communication with the slave unit using the frequency (frequency for communication) for receiving the wireless link establishment demand message by using a slot (master reception slot for communication) that receives the wireless link establishment demand message from the phone slave unit 30 and two slots of going up/down that is completed from the slot (master transmission slot for communication) that is apart for 12 slots from the corresponding slot.

In controlling the sound communication, the control unit 230 of the master unit 20 transmits the frame after receiving the wireless link establishment demand message to the master unit transmission slot for communication using the frequency for communication, and writes the wireless link establishment response message in the MT message buffer that corresponds to the master unit transmission slot for communication of the first control data multiplexer 210 at that time by controlling the wireless unit 201 to perform reception through the master unit reception slot for communication. This wireless link establishment response message is output to the frame processing unit 202 so as to be transmitted at the timing of the master unit transmission slot for communication, and the frame processing unit 202 operates to put the MT message of the wireless link establishment response message in the region of the control data 1 to transmit the MT message, to put the sound data output from the sound processing unit 203 in the region of the sound data, to calculate and put respective error detection codes in the region of the error detection code to transmit the error detection codes.

As described above, an interactive wireless link is established in the slot that is apart for 12 slots between the phone slave unit 30 and the master unit 20. The phone slave unit 30 writes the start demand message of a data link layer of the control data multiplexer 310 in the CT message buffer of the control data multiplexer 310, and the master unit 20 writes the response message of the data link layer of the first control data multiplexer 210 in the CT message buffer of the control data multiplexer 310, and establishes the data link where retransmission control is possible by transmitting and receiving the CT message in the same manner as the above-described transmission and reception of the MT message. The CT message is used for communication to notify a negotiation message of a higher layer such as a network layer, and by using the CT message, the retransmission control is performed if the transmission is not confirmed.

The phone slave unit 30 writes the higher layer message such as the start demand message (SETUP) of a network layer of the control data multiplexer 310 in the CT message buffer of the control data multiplexer 310, and the master unit 20 writes the higher layer message such as the response message (CONNECT) of the network layer of the first control data multiplexer 210 in the CT message buffer of the control data multiplexer 310, and completes a call connection by transmitting and receiving the CT message in the same manner as the transmission and reception of the MT message and performing negotiation of the higher layer through the data link layer in which the transmission is secured to shift to a communicable state.

Next, the operation of the master unit 20 in the case where the sensor slave unit 40 is registered in the master unit 20 will be described. FIG. 11 is a diagram illustrating the kinds and transmission order of control signals that is transmitted by the master unit 20 in the case where the sensor slave unit 40 is registered in the master unit 20. In this case, the format illustrated in FIG. 7 is used in the control signal that is transmitted by the master unit 20, and information, which may be put while the frame is updated, can be replaced. Hereinafter, the replacement of information in the frame will be described in detail.

In the case where the sensor slave unit 40 is registered in the master unit 20, the master unit 20, in addition to the transmission data of the control signal in the case where only the phone slave unit 30 is registered in the master unit 20, transmits four pairs of control data and error detection codes, that is, control data 2 and error detection code 2, control data 3 and error detection code 3, control data 4 and error detection code 4, and control data 5 and error detection code 5.

As illustrated in FIG. 11, in the region of control data 1, the master unit 20 transmits a PT message to notify of information related to paging, such as call information and phone number information of a called party for calling party number notification, in a frame having a frame number that is of 16 integral multiples. Further, in the region of control data 1, the master unit 20 transmits a QT message to notify of system information, such as a frame number, a master unit function, a communication frequency, a standby frequency, and the like, in a frame having a frame number that is of (16 integral multiples+8) and to be used as a reference frame for multi-frame control. Further, in the region of the control data 1, the master unit 20 transmits an NT message to notify of a master unit ID that is the master unit identification information in a frame having other frame numbers.

Further, in the whole frame, the master unit 20 transmits format identification information using the region of the control data 1. In the case where even one sensor slave unit 40 is registered, information indicating that control information such as information to notify of synchronization for TDMA communication or operating state of the master unit using the data regions is transmitted to all registered slave units, using a format of the message of the control signal, in which, in addition to control data 1, control data 2, control data 3, control data 4, control data 5, and their error detection codes are connected according to the format identification information, as shown in FIG. 7.

Further, in the regions of control data 2, control data 3, control data 4, and control data 5, the master unit 20 alternately transmits control channel information and space channel information in duplicate twice in one frame so that the same data do not continue in the same frame. Further, in the region of the same control data, the master unit 20 transmits the information while changing the order of the information whenever the frame number is updated. That is, in the frame having an even frame number, the transmission is performed in the order of the control channel information, the space channel information, the control channel information, and the space channel information, and in the frame having an odd frame number, the transmission is performed in the order of the space channel information, the control channel information, the space channel information, and the control channel information. Through this, if only one control data region can normally be received even if agitation occurs, both data of the control channel information and the space channel information can be acquired if it is possible to receive the data of the control data region as multiple frames.

Next, the operation of each unit in which the master unit 20 transmits the control signal in the case where the sensor slave unit 40 is registered in the master unit 20 will be described with reference to FIG. 3. The control unit 230 of the master unit 20 stores information of the registered slave unit in the EEPROM 222. That is, in the case of registering the slave unit in the master unit 20, the slave unit ID for identifying the slave unit is stored in the EEPROM 222 to match the slave unit classification identification information for identifying whether the slave unit is the phone slave unit 30 or the sensor slave unit 40.

If the sensor slave unit 40 is included in the registered slave units, the control unit 230 of the master unit 20 controls the frame processing unit 202 and the wireless unit 201 to transmit the control signal illustrated in FIG. 11. That is, the control unit 230 selects one of Slot: 1 to Slot: 12, and selects one frequency from a plurality of predetermined frequencies. Using the slot selected to transmit the control signal (hereinafter described as a "control slot") and the frequency, the master unit 20 controls the transmission unit of the wireless unit 201 to be able to transmit the control signal having the format illustrated in FIG. 7.

The control unit 230 controls to write the master unit ID thereof in the NT message buffer of the first control data multiplexer 210, to write call information depending on the event occurrence such as the call reception and phone number information of the called party for the calling party number notification in the PT message buffer, and to sequentially write a control signal to notify system information, such as a frame number of each of 16 frames, a master unit function, a slot number, a use frequency, a standby frequency, and the like, in the QT message buffer. Through this, the first control data multiplexer 210 of the master unit 20 outputs the data of the PT message buffer to the frame processing unit 202 if the frame number becomes of 16 integral multiples, and outputs the data of the QT message buffer to the frame processing unit 202 if the frame number becomes of (16 integral multiples+8). In the case of other frame numbers, that is, if the frame number is neither 16 integral multiples nor (16 integral multiples+8), the first control data multiplexer 210 outputs the data of the NT message buffer to the frame processing unit 202.

Further, the control unit 230 controls to write the control channel information and the space channel information in the second control data multiplexer 211 depending on the operative situation. In a frame having an even frame number, the second control data multiplexer 211 outputs to the frame processing unit 202 the control channel information to match the transmission timing of the control data 2, the space channel information to match the transmission timing of the control data 3, the control channel information to match the transmission timing of the control data 4, and the space channel information to match the transmission timing of the control data 5, respectively. Further, in a frame having an odd frame number, the second control data multiplexer 211 outputs to the frame processing unit 202 the space channel information to match the transmission timing of the control data 2, the control channel information to match the transmission timing of the control data 3, the space channel information to match the transmission timing of the control data 4, and the control channel information to match the transmission timing of the control data 5, respectively.

The frame processing unit 202 generates format identification information indicating that the regions of the control data 2, control data 3, control data 4, and control data 5 are configured in the format illustrated in FIG. 7, in which the control information, such as information to notify of the synchronization for the TDMA communication or the operating state of the master unit, is configured, and a data stream that is transmitted to the region of the control data 1 as the data output from the first control data multiplexer 210. Further, the frame processing unit 202 generates error detection code 1 depending on the data transmitted from the region of the control data 1, error detection code 2 depending on the data transmitted to the control data 2 which is output to match the transmission timing of the control data 2 output from the second control data multiplexer 211, error detection code 3 depending on the data transmitted to the control data 3 which is output to match the transmission timing of the control data 3 output from the second control data multiplexer 211, error detection code 4 depending on the data transmitted to the control data 4 which is output to match the transmission timing of the control data 4 output from the second control data multiplexer 211, and error detection code 5 depending on the data transmitted to the control data 5 which is output to match the transmission timing of the control data 5 output from the second control data multiplexer 211.

Further, the frame processing unit 202 outputs the data stream to the wireless unit 201 to match the timing of the control slot in the order of the synchronization signal, control data 1 (format identification information and data output from the first control data multiplexer 210), error detection code 1, control data 2 (data output from the second control data multiplexer 211), error detection code 2, control data 3 (data output from the second control data multiplexer 211), error detection code 3, control data 4 (data output from the second control data multiplexer 211), error detection code 4, control data 5 (data output from the second control data multiplexer 211), and error detection code 5. Further, the wireless unit 201 converts the data stream into a wireless signal of a predetermined frequency and transmits the wireless signal as the control signal.

Next, the reception operation of the master unit 20 in the case where the sensor slave unit 40 is registered will be described. First, a message communication method between the sensor slave unit 40 and the master unit 20 will be described. Two message transmission methods are possible between the sensor slave unit 40 and the master unit 20. One is a method to establish an interactive wireless link using data with the format illustrated in FIG. 9 in the same manner as the interactive communication between the phone slave unit 30 and the master unit 20, to perform negotiation of higher layers, such as a data link layer and a network layer, and to perform message communication of an application layer that notifies of the sensor state or the like (hereinafter, this method is called a connection message communication method). In the case of performing message transmission and reception of the application layer using the connection message communication method between the sensor slave unit 40 and the master unit 20, the sensor slave unit 40 does not transmit sound data to the master unit 20, and thus the sound data region of FIG. 9 is ignored. At this time, the message of the application layer is transmitted to and received from the region of control data 1 as one of the CT messages. Further, in the case of performing transmission and reception of the message of the application layer in the connection message communication method, it is also possible to stop the transmission and reception of the sound data region, to transmit and receive only the synchronization signal, the control data 1, and the error detection code 1 using the format of FIG. 6, and to perform transmission and reception of the message of the application layer as one of the CT messages.

The other message transmission method between the sensor slave unit 40 and the master unit 20 is a method to perform the message communication of the application layer that notifies of information on the sensor state and the battery voltage of the sensor slave unit, without negotiation of the higher layer such as the network layer, using the data with the format illustrated in FIG. 7 (hereinafter, this method is called a connectionless message communication method). The connectionless message communication method concludes the data transmission only by one slot if no error exists. In this case, in the region of the control data 1, the corresponding slot transmits the format identification information indicating that a message for message communication between applications is transmitted using the data with the format illustrated in FIG. 7 and a master unit identification cord by an NT message. Further, the slot dividedly transmits the data stream, such as a slave unit identification cord, a message identifier indicating that this message is a connectionless message, and the main body of a message, to the regions of the data 2, control data 3, control data 4, and control data 5.

Further, the sensor slave unit 40 is normally unable to receive the control signal from the master unit 20 with a frame of every time. The sensor slave unit 40 measures the transmission interval of the message that is transmitted from the master unit 20 to the sensor slave unit 40, maintains the result of measurement even in an idle state, and periodically performs reception operation to receive the control signal from the master unit 20. The message from the master unit 20 to the sensor slave unit 40 is transmitted to a slot (hereinafter described as a "control slot") set for the control signal in the frame having the frame number that corresponds to a number where 1 is added to a multiple of 2048, using the connectionless message communication method. The sensor slave unit 40 continues counting even in the idle state, and performs reception operation in the timing that can be predicted from the timing when the previous control signal is received with a period of one of 2048 times of the frame period.

Next, a slot through which the master unit 20 receives communication from the sensor slave unit 40 will be described. Since the master unit 20 simultaneously waits for both communication of the connection message communication method and the connectionless message communication method, it performs reception from the sensor slave unit 40 by making all 12 slots that are from Slot: 13 to Slot: 24 in a regular reception state. At this time, the slot that is apart for 12 slots from the control slot performs reception with the same frequency as the transmission frequency of the control signal. Further, other 11 slots perform reception with the reception frequency according to the reception frequency control in the standby slot of which there is notification as the system information of the QT message to wait for the communication from the sensor slave unit 40 and the phone slave unit 30.

Next, referring to FIG. 3, the operation of each block of the master unit 20 in Slot: 13 to slot: 24 will be described. In the slot that is apart for 12 slots from the control slot, the control unit 230 of the master unit 20 performs reception with the same frequency as the transmission frequency of the control signal, and in other slots, the control unit 230 controls the reception unit of the wireless unit 201 to perform reception with the reception frequency according to the reception frequency control in the standby slot of which there is notification as the system information of the QT message. The reception data received in the wireless unit 201 is output to the frame processing unit 202.

The frame processing unit 202 extracts the data stream of the regions of the control data 1 and the error detection code 1 from the reception data of each slot, and determine whether or not the data of the region of the control data 1 is correct data using the received data in the region of the error detection code 1. If the reception signal appears to be configured with the format illustrated in FIG. 7 by the format identification information that is transmitted from the region of the control data 1, the frame processing unit 202 operates to determine whether or not the data of the region of the control data 2, the data of the region of the control data 3, the data of the region of the control data 4, and the data of the region of the control data 5 are correctly received using the data received in the region of the error detection code 2, the data received in the region of the error detection code 3, the data received in the region of the error detection code 4, and the data received in the region of the error detection code 5, respectively, and to notify the control unit 230 of the correctly received data of the control region. The control unit 230 that has received the data of the control data region analyzes the data and starts control depending on the received data.

Next, referring to FIG. 5, the operation of the sensor slave unit 40 will be described. In the sensor slave unit 40, the switch 440 is normally in an off state, and the communication block 400 is in a condition that the power is not supplied thereto. In this state, if a window is changed from a closed state to an open state, or from an open state to a closed state, the sensor unit 443 detects the change and outputs a power-on signal to the power supply control unit 441. If the power-on signal is input, the power supply control unit 441 outputs a switching signal for turning on the switch 440. Through this, the switch 440 is turned on, and the power is supplied to the communication block 400 through the switch 440.

If the power is supplied to the communication block 400, the control unit 430 starts its operation to perform the control according to a program written in the ROM 420. That is, the control unit 430 reads the window state through the sensor unit 443 and notifies the master unit 20 of the read window state with a wireless signal.

As described above, the sensor slave unit 40 shifts from the power supply stop state to the reception state through the power supply to the communication block 400 regularly with a period of one of 2048 times of the frame period, and receives the control signal from the master unit. If there is information to be transmitted from the sensor slave unit 40 to the master unit 20, for example, information on the power supply, in a state where the control signal can be received, the sensor slave unit 40 transmits the information to the master unit 20 using the connectionless message communication method with the next frame which has received the control signal.

Figure 18:
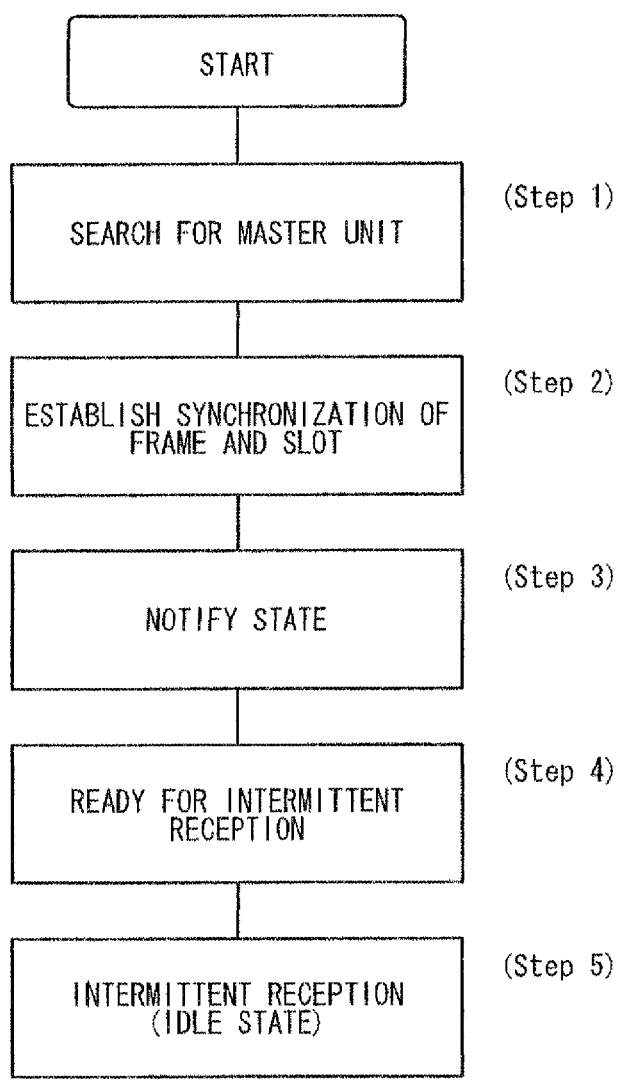
FIG. 18 is a sequence diagram before shifting from power-on of a sensor slave unit illustrated in FIG. 2 to an idle state.

Next, the operation of the sensor slave unit 40 until the sensor slave unit 40 receives the control signal from the master unit 20 after the power-on, transmits necessary information to the master unit 20, and shifts to an idle state will be described in detail. FIG. 18 shows the sequence to shift from power-on to an idle state. As shown in FIG. 18, when the power supply is turned on, master unit search (step 1) to capture the control signal of the master unit 20, frame and slot synchronization establishment (step 2) to establish synchronization of TDMA with the master unit 20 by acquiring a frame number and a slot number that are transmitted from the master unit by the control signal, state notification (step 3) to notify the master unit 20 of the opening and closing state of the window, and intermittent reception preparation (step 4) to perform preparation of the intermittent reception by measuring the transmission interval of a message that is transmitted from the master unit 20 to the sensor slave unit 40 through the slot of the control signal are performed. Thereafter, intermittent reception state (step 5) to wait for a message from the master unit 20 while performing turning on and off of the power of the wireless block 400 to match the transmission timing of the message that is transmitted to the sensor slave unit 40 is performed. Hereinafter, the operation from step 1 to step 5 with the operation of all parts of the sensor slave unit 40 illustrated in FIG. 5 will be described.

First, the master unit search to capture the control signal of the master unit 20 in step 1 will be described. If the power is supplied to the sensor slave unit 40, the control unit 430 starts the master unit search operation and controls the wireless unit 401 to perform consecutive reception operation with a predetermined frequency. The reception data received by the wireless unit 401 is output to the frame processing unit 402. If the data is the control signal from the master unit 20, it may include a synchronization signal illustrated in FIG. 7 and control data next to the synchronization signal. The frame processing unit 402 searches for the synchronization signal illustrated in FIG. 7, extracts the data stream of the regions of the following control data 1 and error detection code 1, and determines whether or not the data of the region of the control data 1 is correct data using the data received from the region of the error detection code 1. If the data is the correct data, the frame processing unit 402 operates to notify the control unit 430 of the data of the region of the control data 1.

If there is notification of the control data, the control unit 430 controls to stop the consecutive reception of the wireless unit 401 and to switch to a synchronous reception operation to perform the reception of the signal in the cycle of 10 msec. If the received control data includes an NT message to notify of the master unit ID, the control unit 430 determines whether or not the received signal is the data that is transmitted from the master unit itself by comparing the master unit ID thereof that is stored in the EEPROM 422 with the reception data. Further, if the initially received data is except for the NT message, the control unit 430 then determines whether or not the received signal is the data that is transmitted from the master unit itself based on the data received by the reception operation in the cycle of 10 msec.

If the received data is the data that is transmitted from the master unit itself, the control unit 430 continues the reception in the cycle of 10 msec, and shifts to the frame and slot synchronization operation in step 2. Further, if the received data is not the data that is transmitted from the master unit itself, the control unit 430 restarts the open search and starts to search for the next master unit. Further, if the control signal of the master unit itself is unable to be received although the master unit search operation is performed for a predetermined time with one frequency or for a predetermined number of times, the control unit 430 controls the wireless unit 401 to perform the consecutive reception operation by changing the reception frequency.

Next, the frame and slot synchronization establishment in step 2 to establish the synchronization of the TDMA with the master unit 20 by acquiring the frame number and the slot number that are transmitted through the control signal of the master unit will be described. If the control unit 430 shifts to the frame and slot synchronization establishment operation, the control unit 430 reads the frame number of the QT message and system information which are put in the region of the control data 1, performs establishment of the synchronization with the frame number and the slot number of the master unit 20 based on the information, and performs in parallel establishment of the synchronization with the frame number and the slot number of the master unit 20 based on the control channel information and the space channel information that are received in the regions of the control data 2, control data 3, control data 4, and control data 5. That is, if the reception error does not occur in the data of the slot that has received the master unit ID of the master unit itself in the region of the control data 1, the control unit 430 establishes the synchronization between the control channel information and the space channel information received in the regions of the control data 2 and control data 3 of the corresponding slot and the frame number and the slot number.

If the communication environment is bad and the whole control data of the synchronization signal is unable to be normally received by the slot once, the synchronization may be established by receiving the synchronization signal with a plurality of frames every 10 msec. For example, in the environment in which the control data 1 and the control data 2 are able to be correctly received by the initial synchronization signal, but when the control data 3, control data 4, and control data 5 are unable to be correctly received, the synchronization of the frame number and the slot number are established by receiving the master unit ID of the master unit itself in the region of the control data 1 of the initial control signal and one part of the control channel information or the space channel information in the region of the control data 2 and then by receiving the other part of the control channel information or the space channel information in the region of the control data 2 of the slot received with the following frame. Further, in the environment in which the control data 2, control data 3, control data 4, and control data 5 are unable to be correctly received, the synchronization of the frame number and the slot number is established by collecting the necessary information in the QT message that is transmitted at the frequency once in 16 frames in the region of the control data 1 in the same manner as the phone slave unit 30.

Figure 12:
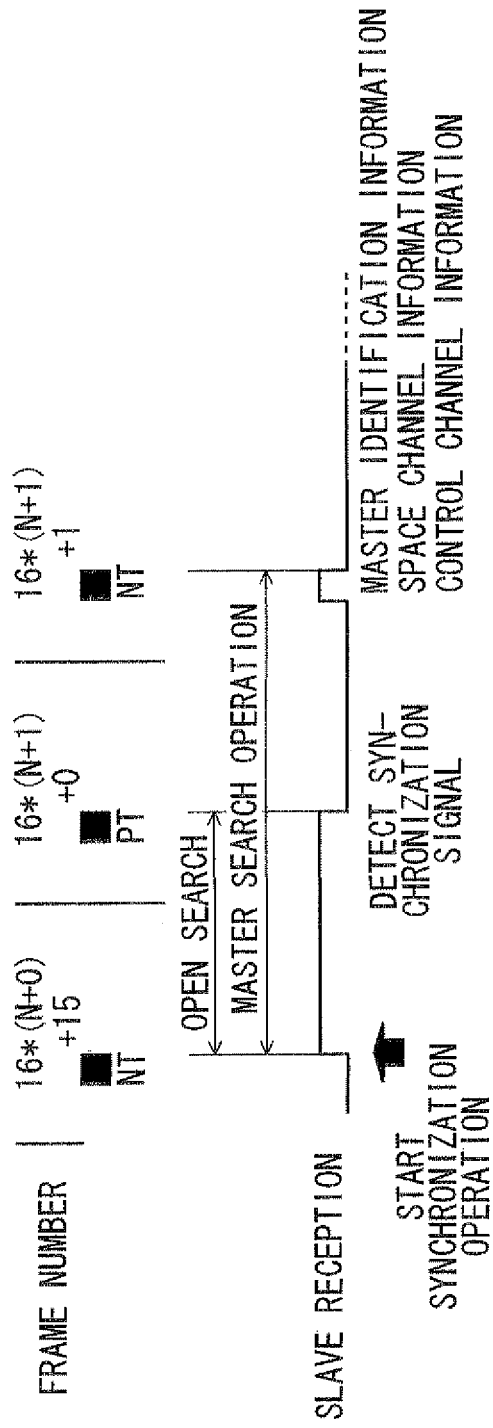
FIG. 12 is a diagram illustrating the operation in which a sensor slave unit illustrated in FIG. 2 establishes synchronization of frames and slots together with a master unit.
Figure 13:
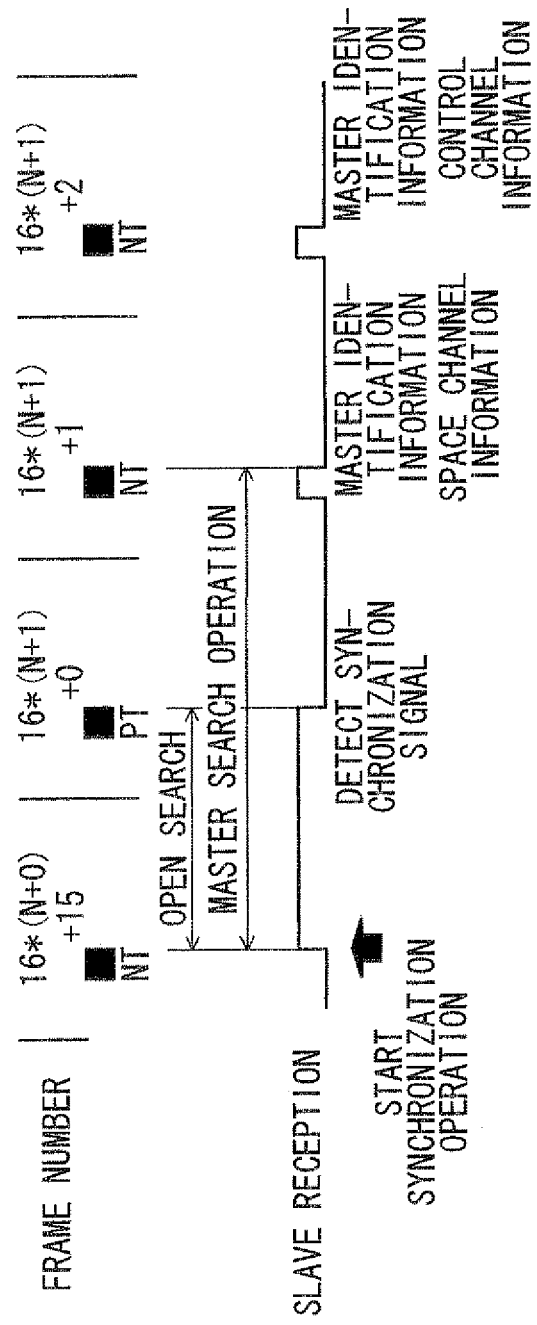
FIG. 13 is a diagram illustrating the operation in which a sensor slave unit illustrated in FIG. 2 establishes synchronization of frames and slots together with a master unit in the case where control data 3, control data 4, and control data 5 are unable to be received.

FIGS. 12 and 13 show examples of the operation from the master unit search operation in step 1 to the establishment of the synchronization of the frame number and the slot number in step 2. The example of FIG. 12 is an example in the case where the reception error does not occur in the data of the slot that has received the master unit ID of the master unit itself in the region of the control data 1. The example of FIG. 13 is an example in which the control data 3, control data 4, and control data 5 are unable to be correctly received, and the synchronization is established based on the reception data of the region of the control data 2 in the slot that has received the master unit ID of the master unit itself and the slot that has received in the next frame in the region of the control data 1. Further, the operation to establish the synchronization only with the data received in the region of the control data 1 in a state where the control data 2, control data 3, control data 4, and control data 5 are unable to be correctly received is the same as the operation until the completion of the frame and slot synchronization operation in the example of the synchronization establishment operation of the phone slave unit 30 illustrated in FIG. 10.

Next, the state notification to notify the master unit 20 of the open and closed state of the window in step 3 will be described. If the synchronization of the frame and the slot in step 3 is completed, the operation to transmit the message which notifies of the opening and closing state of the window to the master unit 20 starts. The control unit 430 of the sensor slave unit 40 performs measurement of the interfering wave level (that is, carrier sense) by controlling the wireless unit 401 to receive the same frequency as the frequency with which the control signal is received in the slot that is apart for 12 slots from the slot of the control signal while continuing the reception of the slot through which the control signal could have been received in each frame. In the case of transmitting the data to the master unit 20 in the connectionless message communication method, the sensor slave unit 40 transmits the data to the slot that is apart for 12 slots from the slot of the control signal. Hereinafter, this slot is called an uplink connectionless data transmission slot. In two consecutive frames, the uplink connectionless data transmission slot is received, and the interfering wave level of the uplink connectionless data transmission slot is measured. In this case, if the interfering wave level is equal to or lower than a prescribed value, the operation is shifted to the operation to notify the master unit 20 of the state of the sensor slave unit 40 in the connectionless message communication method.

Next, the operation for the sensor slave unit 40 to notify the master unit 20 of the opening and closing state of the window in the connectionless message communication method will be described. The control unit 430 of the sensor slave unit 40 is set to perform transmission of the message to notify of the opening and closing state of the window with the same frequency as the frequency with which the control signal is received using the uplink connectionless data transmission slot. FIG. 14 shows a signal format in the case of performing message communication in the connectionless message communication method. The signal of the connectionless message communication method has the configuration that is close to the control signal format shown in FIG. 7, and other control data are connected after control data 1. In FIG. 14, the message transmission regions are described as CLMS 1, CLMS 2, CLMS 3, and CLMS 4. The error detection code 2 is a code for detecting an error of CLMS 1, the error detection code 3 is a code for detecting an error of CLMS 2, the error detection code 4 is a code for detecting an error of CLMS 3, and the error detection code 5 is a code for detecting an error of CLMS 4. The synchronization signal, the control data 1, and the error detection code 1 are the same as those in the control signal format of FIG. 7.

The message to notify of the opening and closing state of the window is dividedly transmitted to regions of CLMS 1, CLMS 2, CLMS 3, and CLMS 4. Since there is notification of the window state in the connectionless message communication method, the control unit 430 of the sensor slave unit 40 sets the master unit ID in the NT message buffer of the first control data multiplexer 410, and sets a CLMS message, which is composed of a slave unit identification code, a message identifier indicating that this message is a connectionless message, and a message to notify of the opening and closing state of the window, in CLMS information of the second control data multiplexer 411.

The first control data multiplexer 410 outputs data of the NT message buffer to the frame processing unit 402 to match the transmission timing of the control data 1 of the uplink connectionless data transmission slot. Further, the second control data multiplexer 411 divides the CLMS message and outputs divided CLMS messages to the frame processing unit 402 to match the transmission timing of CLMS 1, CLMS 2, CLMS 3, and CLMS 4 of the uplink connectionless data transmission slot.

The frame processing unit 402 generates a data stream that is transmitted to the region of the control data 1 with the format identification information indicating that the data stream is configured as the format shown in FIG. 14 to transmit the CLMS message and data output from the first control data multiplexer 410, and generates the error detection code 1 depending on the data that is transmitted from the region of the control data 1. Further, the frame processing unit 402 generates the error detection code 2 depending on the data which is transmitted to CLMS 1 that is output to match the transmission timing of CLMS 1 that is output from the second control data multiplexer 411, generates the error detection code 3 depending on the data which is transmitted to CLMS 2 that is output to match the transmission timing of CLMS 2 that is output from the second control data multiplexer 411, generates the error detection code 4 depending on the data which is transmitted to CLMS 3 that is output to match the transmission timing of CLMS 3 that is output from the second control data multiplexer 411, and generates the error detection code 5 depending on the data which is transmitted to CLMS 4 that is output to match the transmission timing of CLMS 4 that is output from the second control data multiplexer 411.

Then, the frame processing unit 402 outputs the data stream to the wireless unit 401 in the order of the synchronization signal, control data 1 (format identification information and data output from the first control data multiplexer 410), error detection code 1, CLMS 1, error detection code 2, CLMS 2, error detection code 3, CLMS 3, error detection code 4, CLMS 4, and error detection code 5 to match the timing of the uplink connectionless data transmission slot. The data stream output to the wireless unit 401 is converted into a wireless signal having the same frequency as the reception frequency of the control signal and is transmitted to the uplink connectionless transmission slot.

If the transmission of the CLMS message is completed, after the next frame, the control unit 430 of the sensor slave unit 40 controls the wireless unit 401 so that only the slot that receives the control signal continues the reception state. If a reception response indicating that the CLMS message including state information of the sensor slave unit 40 is received from the master unit 20 of the destination is received, the control unit 430 recognizes that the state information of the sensor slave unit 40 has normally reached the master unit 20, and then sets the detection condition of the sensor unit 443 so that the power-on signal is output to the power supply control unit 441 when the window state is changed from the previous notification state to shift to the intermittent reception preparation in step 4.

Further, if the reception response is unable to be received from the master unit during a given time after the message to notify of the window state is once transmitted, retransmission of the message to notify of the opening and closing state of the window is performed at a certain interval in the connectionless message communication method.

Further, if the interfering wave level of the uplink connectionless data transmission slot is high and the connectionless message communication method is unable to be used, and if the reception response is unable to be received from the master unit due to the retransmission of the message in the connectionless message communication method for a prescribed number of times, the communication method is shifted to the connection message communication method to notify the master unit 20 of the opening and closing state of the window and to shift to the intermittent reception preparation in step 4.

Figure 19:
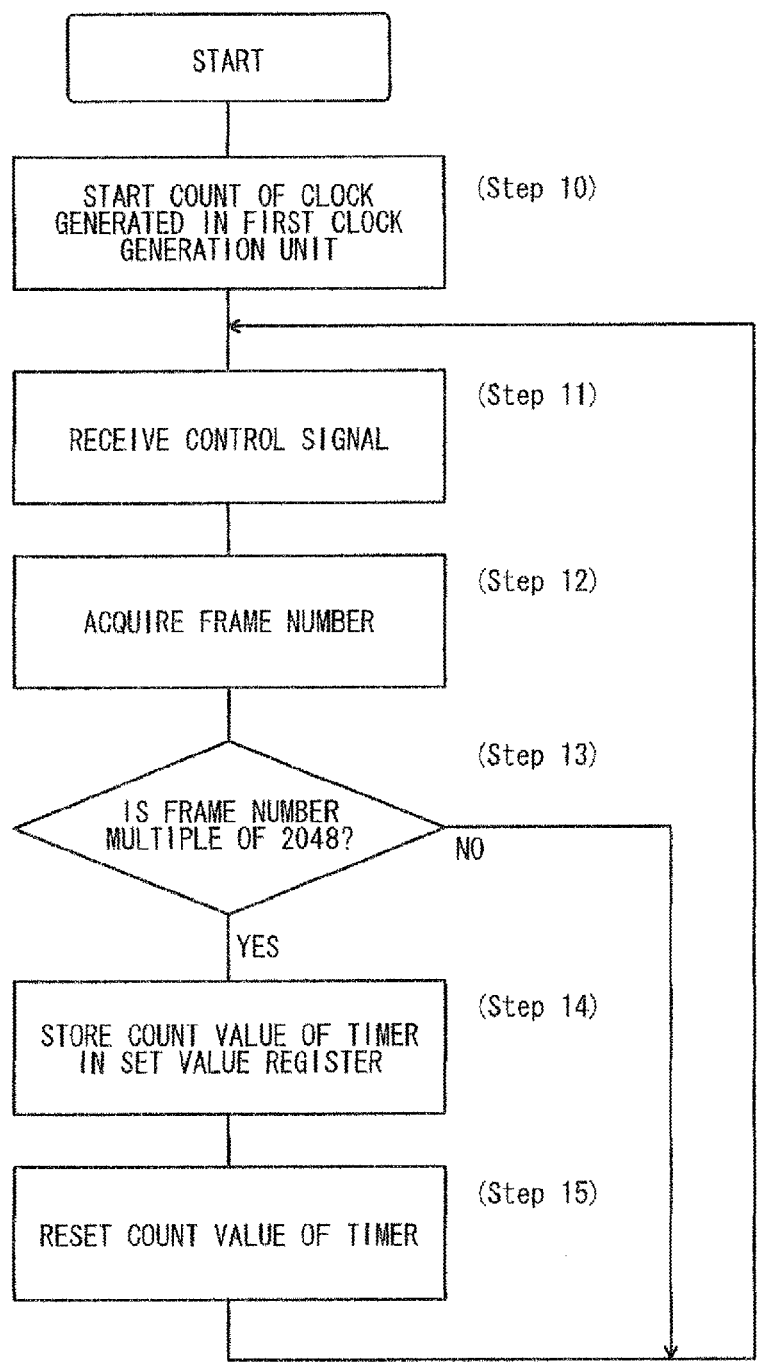
FIG. 19 is a sequence diagram for a sensor slave unit to measure a transmission interval of a message that is transmitted to the sensor slave unit.

Next, the intermittent reception preparation to perform preparation of the intermittent reception by measuring the transmission interval of the message that is transmitted from the master unit 20 to the sensor slave unit 40 through the slot of the control signal in step 4 will be described. FIG. 19 is a sequence diagram for the sensor slave unit 40 to measure the transmission interval of the message that is transmitted to the sensor slave unit. If transmission of the message to notify the master unit 20 of the state is completed, the control unit 430 of the sensor slave unit 40 stops the transmission, and controls the wireless unit 401 to receive the control signal in the cycle of 10 msec. That is, the control unit 430 controls to continue the reception operation in the cycle of 10 msec until the control signal of the frame having the frame number where 1 is added to a multiple of 2048 is received twice. The frame number at that time is put on the control signal from the master unit 20.

First, the timer unit 442 starts counting of a clock generated by the first clock generation unit 446 (step 10). If the control signal is received by the reception operation in the cycle of 10 msec (step 11), the timer unit 442 acquires the frame number that is put on the control signal (step 12), and determines whether or not the frame number coincides with 2048 or a multiple of 2048 (step 13). If the frame number does not coincide with 2048 or a multiple of 2048 (No), the tinier unit 442 waits for the same next control signal after 10 msec. If the frame number coincides with 2048 or a multiple of 2048 (Yes), the timer unit 442 stores the count value in a set value register of the timer unit 442 (step 14). Thereafter, the counter is reset (step 15), and the timer unit 442 waits for the next control signal after 10 msec. Through this, the control unit 430 measures the elapsed time of 2048 frames using the clock generated by the first clock generation unit 446. The value stored in the set value register of the timer unit 442 when the control signal of the frame having the frame number where 1 is added to a multiple of 2048 is received twice is assumed a tinier set value for intermittent reception.

Next, the control unit 430 of the sensor slave unit 40 writes the reception frequency in the EEPROM 422 by writing the information that indicates the in-service state in the state memory unit 445. Lastly, the control unit 430 outputs the power-off signal to the power supply control unit 441. If the power-off signal is input, the power supply control unit 441 outputs a switching signal to turn off the switch 440, and the switch 440 intercepts the power supply to the communication block 400 depending on the switching signal.

Next, the intermittent reception (step 5) to wait for the message from the master unit 20 while performing turning on and off of the power of the wireless block 400 to match the transmission timing of the message that is transmitted to the sensor slave unit 40 will be described. The timer unit 442 and the first clock generation unit 446 of the sensor slave unit 40 are always driven by the battery. The timer unit 442 always counts the clock of the first clock generation unit 446, and if the count value reaches the timer set value for intermittent reception that is stored in the above-described set value register, the power-on signal from the timer unit 442 is output to the power supply control unit 441 to supply the power to the communication block 400, and the control unit 430 starts its operation. The control unit 430, which has started its operation, checks the power supply control unit 441, and if it is recognized that the factor of the power-on is the expiration of the timer, the control unit 430 reads the state memory unit 445. If the information that indicates the in-service state, in which the signal from the master unit last time is receivable, is written in the state memory unit 445, the control unit 430 reads the reception frequency from the EEPROM 422 and controls the wireless unit 401 to perform reception operation with the read frequency. That is, in the case of the in-service state during the reception operation last time, the control unit 430 does not perform the master unit search indicated in step 1 of FIG. 18, but performs reception operation with the frequency stored in the EEPROM 422.

If the control signal of the master unit is received, the control unit 430 performs transmission and reception of the necessary information, and then determines the timer set value for the intermittent reception based on the received frame number and the timing in the same manner as described above. Further, the control unit 430, in the same manner as described above, sets the timer set value for the intermittent reception in the register of the timer unit 442, and repeats the above-described operation by outputting the power-off signal to the power supply control unit 441.

Next, the operation in the case where the window state of the sensor slave unit 40 is change will be described. If the window state is changed, the power-on signal from the sensor unit 443 is output to the power supply control unit 441 to supply the power to the communication block 400, and the control unit 430 starts its operation. The control unit 430, which has started its operation, checks the power supply control unit 441, and if it is recognized that the factor of the power-on is the change of the window state, the control unit 430 performs the operation from step 1 to step 5 until the sensor slave unit 40 shifts to the idle state after the power-on, notifies the master unit 20 of the new window state, and returns to the idle state.

Figure 20:
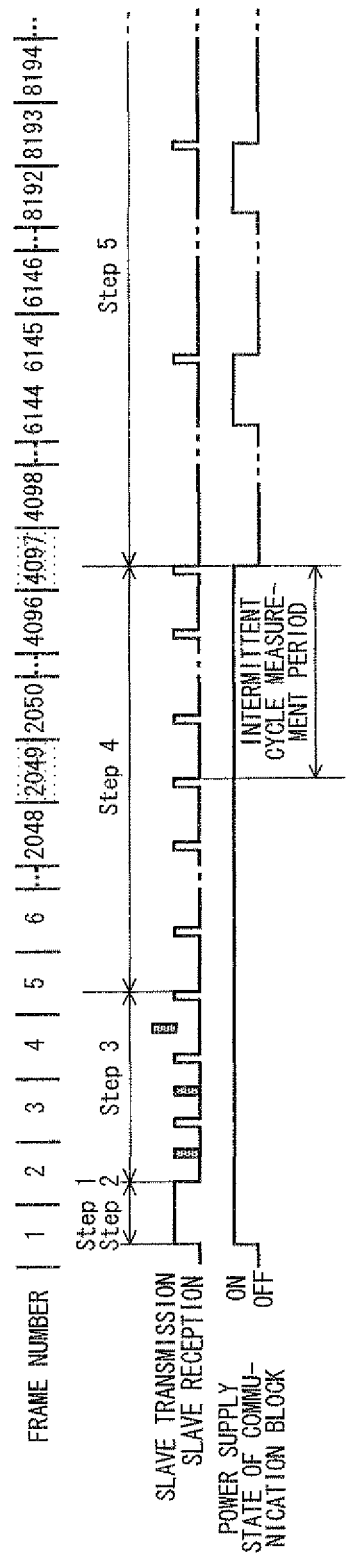
FIG. 20 is a diagram illustrating an example of the operation before shifting from power-on of a sensor slave unit illustrated in FIG. 2 to an idle state.

Next, the operation until the sensor slave unit 40 shifts to the idle state will be described using FIG. 20. FIG. 20 illustrates an example of the operation before the power is supplied to the wireless block 400 by the power-on or the window state change, the window state is sent to the master unit 20, and the sensor slave unit 40 shifts to the idle state, that is, an example of the operation from step 1 to step 5 of FIG. 18. In the following description, the frame having the frame number N shown in the drawing is described as frame N. In an example of FIG. 20, the power-on or the window state change occurs in frame 1, and the power is supplied to the communication block to start the consecutive reception in step 1. Then, simultaneously with the acquisition of the master unit in frame 2, the synchronization of the frame and the slot in step 2 is completed. Then, the processing shifts to step 3 in which the state notification is performed, the interfering wave level of the transmission slot is measured with frame 2 and frame 3, and the transmission of the message to notify frame 4 of the window state change is performed. Then, the response from the master unit is received with frame 5, step 3 is completed, and the processing shifts to the intermittent reception preparation in step 4.

In the reception operation in step 4 that starts with frame 5, the reception in the cycle of 10 msec continues until the frame having the frame number where 1 is added to a multiple of 2048 arrives twice in a state where the master unit 20 transmits the message to the sensor slave unit. In FIG. 20, the reception in the cycle of 10 msec continues until 4097 frames. The sensor slave unit 40 measures time with a clock generated by the first clock generation unit 446 in the periods of 2049 frames and 4097 frames, and stores the value that corresponds to the timing to turn on the power of the communication block 400 in the set value register of the timer unit 442 in order to perform reception in the next reception timing (frame 6145). Further, the intermittent reception in step 5 is performed through interception of the power of the wireless block 400.

If the timer 442 that continues counting expires, the power is put to the wireless block 400, the reception is performed to match the transmission timing of the control signal of the frame 6145, and the value that corresponds to the timing of power-on is stored in the set value register of the timer 442 for reception in the next reception timing (frame 8193) based on a difference between the assumed reception timing and the actually received timing. Then, the power of the wireless block 400 is intercepted. Thereafter, whenever the timing unit 442 is expired until the sensor unit 443 detects the window state change (the count value reaches the value of the set value register) and the reception is performed, the power interception operation of the wireless block 400 is repeated by determining the timer set value based on the difference between the assumed reception timing and the actually received timing.

Next, the operation in which the master unit 20 receives the CLMS message to notify of the window state from the sensor slave unit 40 will be described. The wireless signal that includes the CLMS message transmitted from the sensor slave unit 40 is received in the wireless unit 201 of the master unit 20, and is output to the frame processing unit 202. The frame processing unit 202 extracts the data stream of the regions of the control data 1 and the error detection code 1 from the wireless signal, and determines whether or not the data of the region of the control data 1 is correct data using the data received from the region of the error detection code 1. Then, if the reception signal appears to be configured with the format illustrated in FIG. 14 by the format identification information of the reception signal, the frame processing unit 202 determines whether or not the data of the region of CLMS 1, the data of the region of CLMS 2, the data of the region of CLMS 3, and the data of the region of CLMS 4 are correctly received using the data received in the region of the error detection code 2, the data received in the region of the error detection code 3, the data received in the region of the error detection code 4, and the data received in the region of the error detection code 5, respectively. If the data received in the regions of CLMS 1, CLMS 2, CLMS 3, and CLMS 4 are all correctly received, the frame processing unit 202 operates to combine the data received in the regions of CLMS 1, CLMS 2, CLMS 3, and CLMS 4, and to notify the control unit 230 of the combined data together with the data received in the region of control data 1 as one CLMS message.

If the data received in the region of control data 1 is the NT message of the master unit identification information that is the same as its own ID, the control unit 230, which has received the reception data of the region of control data 1 and the CLMS message, determines that the CLMS message is addressed to the control unit 230 itself, and starts the operation depending on the information notified of by the CLMS message. If the data received in the region of control data 1 is other than the NT message of the master unit identification information that is the same as its own ID, the control unit 230 discards the CLMS message. Further, the control unit 230 determines whether or not the sensor slave unit is the sensor slave unit which an origin of transmission has been registered from the slave unit identification code included in the CLMS message, and if the CLMS message is from the slave unit of non-registration, the control unit 230 discards the CLMS message.

If the CLMS message that notifies of the window state is received from the registered sensor slave unit, the control unit 230 displays the window state of the corresponding sensor slave unit on the display unit 223. Further, the display of the window state is the display on LCD or the display by sound such as ringer, and if it is set to notify of the opening of the window in beep sound, the control unit 230 notifies persons of the opening of the window by making a ringer sound rumble, and operates to stop the ringer by the instruction from the operation unit 224.

Next, the operation to notify of the reception response indicating that the CLMS message including window information has been normally received from the master unit 20 to the sensor slave unit 40 when the master unit 20 receives the CLMS message including the window information from the sensor slave unit 40 will be described. The message to notify of the reception of the CLMS message that notifies of the wind state (hereinafter described as "reception response") is transmitted to the slave unit with the same frequency as the control signal through the slot that transmits the control signal using the format of FIG. 14. That is, the control unit 230 of the master unit 20 sets the CLMS message, which includes a slave unit identification code of the sensor slave unit 40 that is the destination, a message identifier indicating that this message is a connectionless message, and a message to notify of reception response, in the CLMS information of the second control data multiplexer 211 to match the timing of the control slot of the frame to transmit the master unit identification code in the region of control data 1. Accordingly, the second control data multiplexer 211 divides the CLMS message, and outputs the divided CLMS messages to the frame processing unit 402 to match the transmission timing of CLMS 1, CLMS 2, CLMS 3, and CLMS 4 of the control signal.

The frame processing unit 202 generates a data stream that is transmitted to the region of the control data 1 by putting the format identification information indicating that the data stream is configured with the format (FIG. 14) to transmit the CLMS message and data (master identification, information) output from the first control data multiplexer 210 on the region of control data 1, and generates the error detection code 1 depending on the data that is transmitted to the region of the control data 1. Further, the frame processing unit 202 generates the error detection code 2 depending on the data which is transmitted to CLMS 1 that is output to match the transmission timing of CLMS 1 that is output from the second control data multiplexer 211, generates the error detection code 3 depending on the data which is transmitted to CLMS 2 that is output to match the transmission timing of CLMS 2 that is output from the second control data multiplexer 211, generates the error detection code 4 depending on the data which is transmitted to CLMS 3 that is output to match the transmission timing of CLMS 3 that is output from the second control data multiplexer 211, and generates the error detection code 5 depending on the data which is transmitted to CLMS 4 that is output to match the transmission timing of CLMS 4 that is output from the second control data multiplexer 211.

Then, the frame processing unit 202 outputs the data stream to the wireless unit 201 in the order of the synchronization signal, the above-described control data 1 (format identification information and master unit identification information output from the first control data multiplexer 210), the error detection code 1, the CLMS 1, the error detection code 2, the CLMS 2, the error detection code 3, the CLMS 3, the error detection code 4, the CLMS 4, and the error detection code 5 to match the timing of the control slot. The data stream output to the wireless unit 401 is converted into a wireless signal having the frequency for the control signal and is transmitted to the control slot. If the transmission of the CLMS message is completed, the control unit 230 controls to return to the state where the control signal illustrated in FIG. 11 is transmitted to the control slot after the next frame.

Next, using FIGS. 15, 16, and 17, the transmission and reception switching operation of each slot when there is notification of the window state change will be described. In the following description, the frame having the frame number N illustrated in the drawing is described as frame N, and the slot having the slot number N is described as Slot: N.

Figure 15:
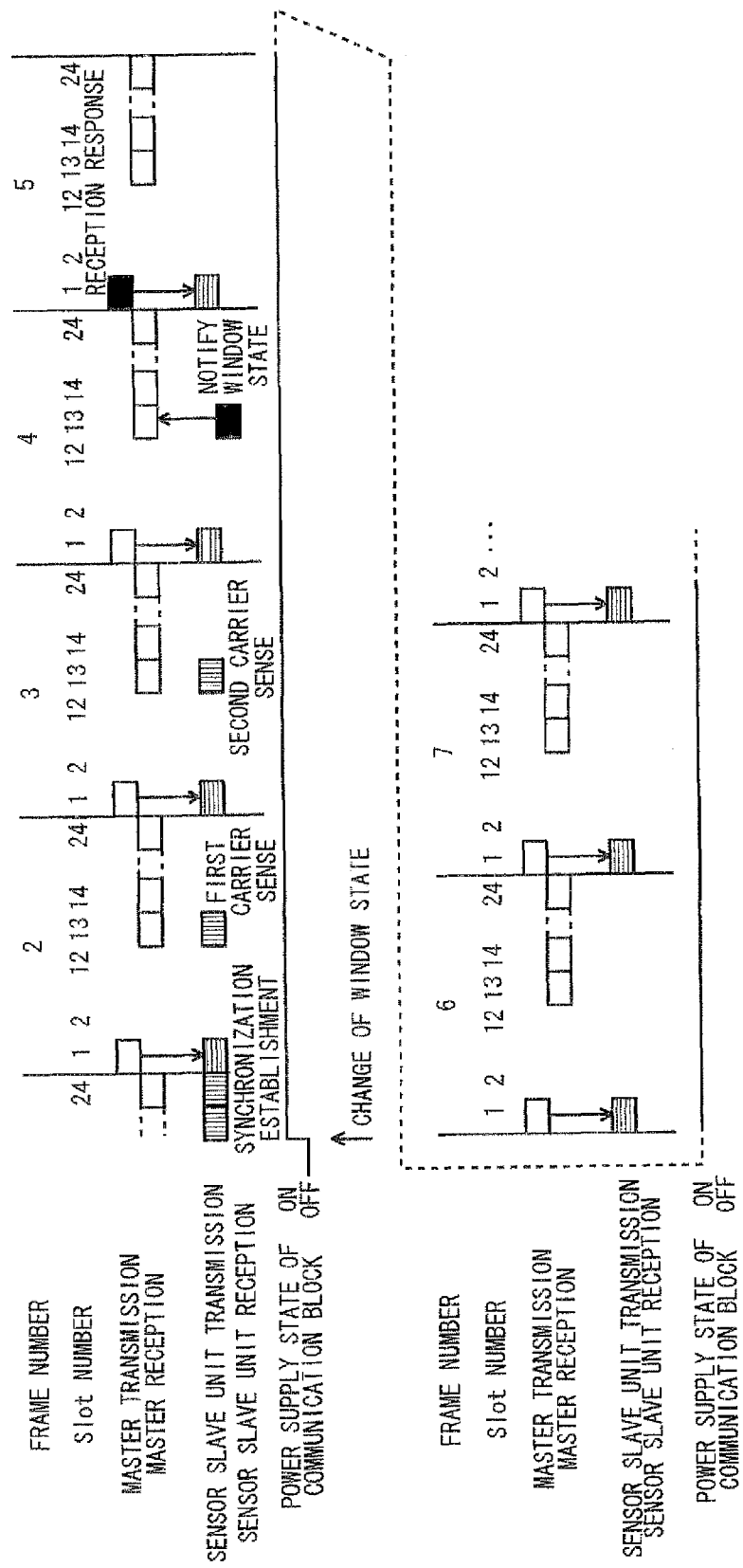
FIG. 15 is a diagram illustrating an example of the operation in which a sensor slave unit illustrated in FIG. 2 establishes synchronization with a master unit through change of a window state of the sensor slave unit and notifies the master unit of the window state through a CLMS message.

FIG. 15 is a diagram illustrating an example of the operation in which the above-described sensor slave unit 40 detects the change of the window state, supplies the power to the communication block 400, establishes the synchronization with the master unit 20 that transmits the control signal to Slot: 1, notifies the master unit 20 of the window state by the CLMS message, and shifts to a state where the reception of the reception signal of the control signal is performed in the cycle of 10 msec, that is, an example of the operation to complete the operation from step 1 to step 3 in FIG. 18 and to shift to step 4. In the example of FIG. 15, the sensor slave unit 40 starts the operation for synchronization by supplying the power to the communication block 400 if the window state is changed at a certain time before frame 1, and starts the consecutive reception (open search). If the synchronization signal of the reception data is detected, the sensor slave unit 40 acquires the master unit identification information or the like by the following data, confirms whether or not the control signal is truly from the master unit, and establishes the synchronization if the control signal is from the registered master unit. In the example of FIG. 15, the synchronization with the control signal of the master unit is established with Slot: 1 of frame 2.

Then, the sensor slave unit 40 selects Slot: 13 that is apart for 12 slots, which is the number of slots that correspond to a half of the number of slots accommodated in the frame, from the slot that has received the control signal as the slot to perform the transmission of the CLMS message. Further, the sensor slave unit 40 transmits the CLMS message to notify of the window state to Slot: 13 of frame 4 by performing carrier sense to confirm the existence/nonexistence of the interfering waves with respect to Slot: 13 of frame 2 and frame 3.

Further, the sensor slave unit 40 continues the reception of the control signal of the master unit with Slot: 1 of frame 2 and the control signal with Slot: 1 of the frame after the synchronization establishment, maintains the synchronization with the master unit 20, and waits for the reception response to notify of the reception of the CLMS message. In the example of FIG. 15, the sensor slave unit 40 receives the reception response from the master unit 20 with frame 5, and stops the operation to notify of the window state change to intercept the power supplied to the communication block 400. Further, both the reception frequency during the carrier sense with Slot: 13 and the transmission frequency of the CLMS message are the same as the reception frequency of the control signal with Slot: 1, Next, using FIG. 16, the operation in the case where the communication of the CLMS message that notifies of the window state does not succeed at once will be described. FIG. 16 illustrates an example of the operation to notify of the window state change through retransmission of the CLMS message to notify of the window state. In this example, the sensor slave unit 40 retransmits the CLMS message to notify of the window state if the reception response is unable to be received from the master unit within four frames after the CLMS message to notify of the window state is transmitted. If the CLMS message to notify of the window state is received, the master unit 20 transmits the reception response to continue with the frame afterwards.

Figure 16:
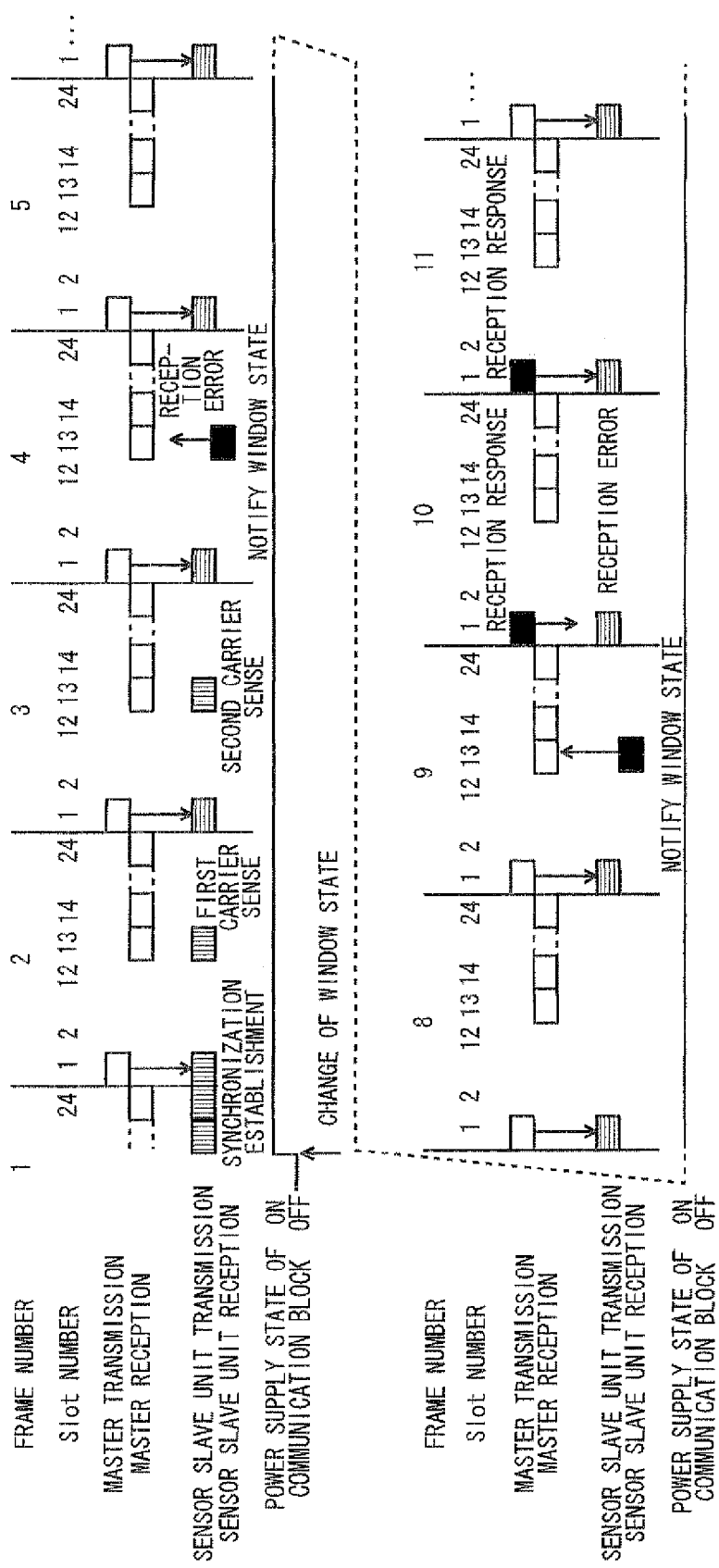
FIG. 16 is a diagram illustrating an example of the operation in which a sensor slave unit illustrated in FIG. 2 establishes synchronization with a master unit through change of a window state of the sensor slave unit and notifies the master unit of the window state through repetition of a CLMS message.

In the example of FIG. 16, the operation to frame 5 that initially transmits the CLMS message after the window state of the sensor slave unit 40 is changed is the same as that in FIG. 15, and the explanation thereof will not be repeated. In the example of FIG. 16, the operation is the operation in the case where the CLMS message that is transmitted to Slot: 13 of frame 4 does not reach the master unit 20. If the CLMS message does not reach the master unit 20, the master unit 20 transmits a normal control signal to the next frame 5, in a period from frame 5 to frame 9 after the transmission of the CLMS message, the sensor slave unit 40 waits for the reception response from the master unit. If the reception response is unable to be received even from Slot: 1 of frame 9, the sensor slave unit 40 retransmits the CLMS message to Slot: 13 of frame 9.

If the CLMS message that is transmitted to Slot: 13 of frame 9 is normally received in the master unit 20, the master unit 20 starts the transmission of the reception response in the transmission slot of the control signal, that is, Slot: 1, in the frame 10. At this time, in consideration of the occurrence of the reception error, in order to improve the communication quality, the master unit 20 operates to transmit the reception response to the frame that transmits the NT message multiple times, and in the example of FIG. 16, the master unit 20 transmits the reception response with frame 10 and frame 11.

The example of FIG. 16 shows that the reception error occurs in Slot: 1 of frame 10 in the sensor slave unit 40 and the reception response that is transmitted from the master unit 20 is received in Slot: 1 of frame 11. The sensor slave unit 40 that has received the reception response with Slot: 1 of frame 11 recognizes that the information of the window state change is received in the master unit 20 through the reception response, stops the operation to notify of the window state change, and shifts to a state where the reception signal of the control signal is received in the cycle of 10 msec in which Slot: 1 performs the reception. Further, the reception frequency during the carrier sense in Slot: 13 and the transmission frequency of the CLMS message are the same as the reception frequency of the control signal in Slot: 1.

Next, using FIG. 17, the operation in the case where the communication of the CLMS message to notify of the window state does not succeed and there is notification of the window state in the master unit 20 through shifting to the connection message communication method will be described. If the reception response is unable to be received from the master unit even in the transmission of the CLMS message of the number of times decided beforehand and if the interfering wave level of the uplink connectionless data transmission slot detected by the carrier sense is high and the CLMS message is unable to be transmitted, the sensor slave unit 40 starts the operation to transmit the window state gain by the connection message communication method.

In this case, in the same manner as the interactive communication between the above-described phone slave unit 30 and the master unit 20, the sensor slave unit 40 establishes the interactive wireless link, performs negotiation of a higher layer such as a network layer, and notifies the master unit 20 of the window state in the connection message communication method which performs message communication of an application layer that notifies of the sensor state. FIG. 17 shows an example of operation in the case where the sensor slave unit 40 and the master unit 20 establish the interactive wireless link, start the data link layer using an interactive wireless communication path, perform negotiation of the network layer, and notify of the window state change. The operation in which the window state is changed, the power is supplied to the communication block, and the CLMS message to notify the window state is transmitted multiple times is the same as that illustrated in FIG. 16, and thus this will not be repeated in FIG. 17. FIG. 17 shows the operation in a state where the CLMS message is transmitted a prescribed number of times and the reception response is unable to be received within a prescribed time.

Figure 17:
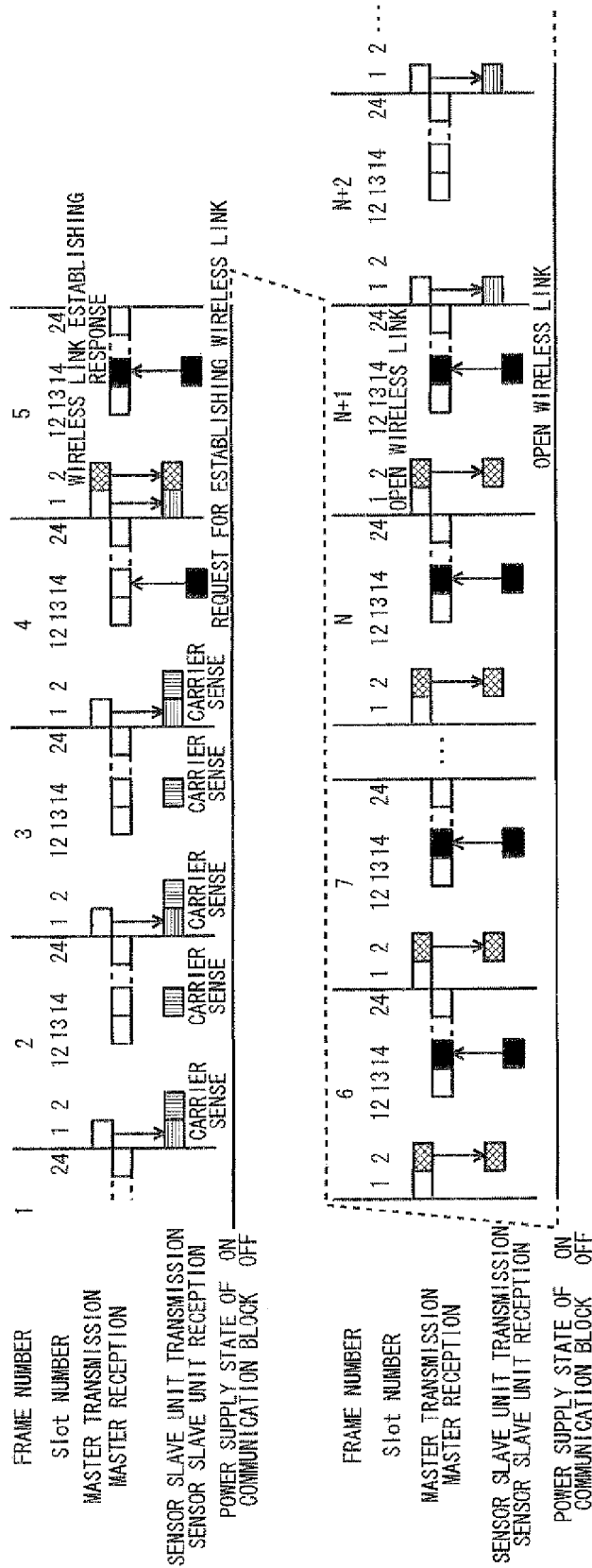
FIG. 17 is a diagram illustrating an example of the operation in which a sensor slave unit illustrated in FIG. 2 establishes interactive wireless re-synchronization with a master unit and notifies of a window state.

FIG. 17 shows an example to start the wireless communication by the connection message communication method with frame 2. The sensor slave unit 40 selects Slot: 2 for reception among reception slots (that is, Slot: 2 to slot: 12) except for Slot: 1 that performs the reception of the control signal of the master unit 20 of frame 2, selects Slot: 14 for transmission that is apart for 12 slots from slot: 2, and establishes the interactive wireless link using Slot: 2 for reception and Slot: 14 for transmission 14 to perform the communication. At this time, sensor slave unit 40 selects the frequency that is used for communication among communication frequencies of which the control signal notifies. Further, the frame when the standby frequency of the master unit 20 coincides with the selected frequency is determined as the frame that transmits the wireless link establishment message, and before the transmission of the wireless link confirmation demand message, the carrier sense is performed with the selected frequency in the selected transmission and reception slot.

FIG. 17 shows the operation in the case where the master unit 20 selects the standby frequency with frame 4, and the sensor slave unit 40 transmits the wireless link establishment demand to Slot: 14 of frame 4 through performing of the carrier sense of Slot: 2 and Slot: 14 from frame 2. Further, the sensor slave unit 40 detects the interfering waves by the carrier sense, and if it is determined that the transmission is not possible, it controls to change at least one of the communication frequency and the slot, to newly perform carrier sense, and to transmit the wireless link establishment demand message.

If the wireless link establishment demand message is received from the standby slot in FIG. 17, Slot: 14), the master unit 20 fixes the reception frequency of the slot (in FIG. 17, Slot: 14) that has received the wireless link establishment demand message to the frequency that has received the wireless link establishment demand message even with respect to the following frame, and transmits a wireless link establishment response message to the slot that is apart for 12 slots from the slot that has received the wireless link establishment demand message. In FIG. 17, the wireless link establishment response message is transmitted to Slot: 2 of frame 5.

If the wireless link establishment response message is received, the sensor slave unit 40 shifts to the wireless link establishment state, stops the reception of the control slot, and performs transmission and reception in slots (Slot: 2 and Slot: 14) for communication. Further, if the wireless link establishment response message is unable to be received, in the same manner as the case where it is determined that the transmission for the carrier sense is not possible, the sensor slave unit 40 operates to newly work again from the carrier sense through changing of at least one of the communication frequency and the slot.

In FIG. 17, the sensor slave unit 40 receives the wireless link establishment response message of frame 5, shifts to the wireless link establishment state, and performs transmission and reception in the slot for communication after frame 6. Thereafter, the sensor slave unit 40 and the master unit 20 perform the wireless communication using Slot: 2 and Slot: 14, perform start of the data link layer for retransmission control and start of the network layer, and perform transmission and reception of the message to notify of the window state and the response. Then, if the notification of the window state is completed, the sensor slave unit 40 performs stopping of the network layer, stopping of the data link layer, and the opening of the wireless link, and shifts to the intermittent reception preparation state that performs the reception of the control signal in the cycle of 10 msec in step 4 illustrated in FIG. 18. FIG. 17 shows that the communication from frame 6 to Slot: 14 of frame N+1 is performed, performs the start of the data link layer, start of the network layer, a message to notify of the window state, transmission and reception of the response, stopping of the network layer, stopping of the data link layer, and the opening of the wireless link, and then performs the reception of the control slot (Slot: 1) in frame N+2.

Next, the operation for the master Unit 20 to notify the phone slave unit 30 of the reception of the CLMS message including the window state sent from the sensor slave unit 40 will be described. In the same manner as the notification of the outside call reception message, the notification from the master unit 20 to the phone slave unit 30 is performed using the PT message of the control signal that is transmitted to the control slot. That is, if the CLMS message to notify of the window state is received from the sensor slave unit 40, the control unit 230 of the master unit 20 writes the PT message (hereinafter described as the "window state notification message") that notifies of the window state of the sensor slave unit 40 in the PT message buffer of the first control data multiplexer 210. This window state notification message is output and transmitted to the wireless unit 201 in the timing in which, the frame number is a multiple of 16.

On the other hand, the phone slave unit 30 performs the reception in the timing in which the frame number becomes a multiple of 16 in the idle state, and in the same manner as the outside call reception message, the window state notification message is received in the wireless unit 301 and is output to the frame processing unit 202. Then, the frame processing unit 202 extracts and outputs the data received in the region of control data 1 illustrated in FIG. 6, that is, the window state notification message notification message, to the control unit 330. If the window state notification message is received, the control unit 330 controls the display unit 323 to display the window state change by making a linger sound rumble or the like. Since the window state notification message is transmitted as a part of the control signal as the PT message, the sensor slave unit 40 that waits for the reception of the reception response can also receive the message. If the window state notification message is received before the reception response is received from the master unit 20, in the same manner as the case where the reception response is received, the sensor slave unit 40 may control to intercept the power supply to the communication block 400 and to return to the normal state.

Next, the operation for the master unit 20 to transmit a message to notify of caution mode setting to the sensor slave unit 40 will be described. The message to notify of caution mode setting is transmitted to the sensor slave unit 40 in the same manner as the operation of sending the message to notify of the reception response to the sensor slave unit 40, when the CLMS message to notify of the window state is received in the sensor slave unit 40. That is, except that the message to notify of the caution mode setting is transmitted by selecting a frame having the frame number where 1 is added to a multiple of 2048, the message to notify of the caution mode setting is transmitted instead of the message to notify of the reception response in the same manner as the operation of sending the message to notify of the reception response to the sensor slave unit 40, when the CLMS message to notify of the window state is received in the sensor slave unit 40. In addition, the master unit 20 notifies the sensor slave unit 40 of a set state each time settings of the caution mode are changed in the operation unit 224, and notifies the sensor slave unit 40 of the set state using the frame having the frame number where 1 is added to a multiple of 2048 until a message of reception confirmation arrives from the sensor slave unit 40.

Next, the operation for the sensor slave unit 40 to receive the message to notify of the caution mode setting will be described. When the message to notify of the caution mode setting is received, the sensor slave unit 40 transmits a message of reception confirmation to notify that the message to notify of the caution mode setting has been received, to the master unit 20 using the connectionless communication method, in the same manner as a case where a window state notification is transmitted to the master unit 20 using the connectionless communication method. That is, when the sensor slave unit 40 receives the message to notify of the caution mode setting during the intermittent reception, the control unit 430 writes the notified caution mode setting in the EEPROM 422. In addition, a message of reception confirmation is transmitted to the master unit 20 using a slot after twelve slots from a slot with which the message is received. Thereafter, the sensor slave unit 40 outputs a power-off signal to the power supply control unit 441. In addition, the power supply to the wireless block 400 is turned off and returns to an intermittent reception state.

In addition, in a state where the caution mode is set to be turned on, when a window state varies from a closing state to an opening state and power is supplied to the wireless block 400, the sensor slave unit 40 is operated so as to notify the surroundings that the window is open by generating a warning sound from the notification unit 423 until the power supply to the wireless block 400 is turned off.

Next, the operation in the case where the sensor slave unit 40 is unable to receive a control signal of the master unit 20 will be described. In the case where the control signal of the master unit 20 is unable to be received when reception timing arrives and a reception operation is started, the sensor slave unit 40 performs a reception in the cycle of 10 msec and continues the operation of receiving the control signal of the master unit. In the case where the control signal is unable to be received through search for the master unit for a specific time, the control unit 430 writes information indicating an out-of-service state in the state memory unit 445, and thereby starts an operation of recapturing the control signal of the master unit thereafter.

In other words, if the sensor slave unit 40 continuously fails to receive the control signal of the master unit in the intermittent reception state in step 5 shown in FIG. 18, the sensor slave unit 40 is operated so as to return to the master unit search in step 1. In addition, in the case where the master unit search is started and the control signal of the master unit 20 is unable to be captured within a specific time, the control unit 430 writes information indicating an out-of-service state in the state memory unit 445. Further, the control unit 430 sets a timer value according to the master unit search cycle in the timer unit 442, and outputs a power-off signal to the power supply control unit 441. When the power-off signal is input, the power supply control unit 441 outputs a switching signal for turning off the switch 440, and the switch 440 cuts off power supply to the communication block 400 in response to the switching signal. Accordingly, the sensor slave unit 40 stops an operation until an operation of recapturing the control signal of the master unit 20 is started at the next time, and, during that time, the information indicating an out-of-service state at the previous time is maintained by the state memory unit 445 which maintains the memory using a battery at all times. In addition, during that time, the timer unit 442 continues counting using a battery.

When the timer unit 442 continues counting regardless of the state of the switch 440 and stops the counting since the master unit search cycle arrives, a power-on signal is output to the power supply control unit 441 from the timer unit 442, power is supplied to the communication block 400, and the control unit 430 starts an operation.

When the control unit 430 starts the operation, checks the power supply control unit 441, and recognizes the counting stop as a factor of the power-on, the information in the state memory unit 445 is read. In the case where information indicating an out-of-service state is written in the state memory unit 445, the control unit is operated so as to perform the master unit search in step 1 shown in FIG. 18. In addition, in the case where the control signal of the master unit 20 is unable to be captured within a specific time again, the control unit 430 sets a timer value according to the master unit search cycle in the timer unit 442, outputs a power-off signal to the power supply control unit 441, and repeatedly performs power-off of the wireless block 400 and the master unit search in step 1 according to the master unit search cycle until the control signal of the master unit is captured.

Next, the operation of repeatedly performing the master unit search while changing a ratio of a master unit search time and a power-off time of the wireless block 400 will be described. If the master unit is captured through the master unit search in step 1, the sensor slave unit 40 clears a storage region of the EEPROM 422 related to the number of continuous failures in the master unit search to zero. On the other hand, in the case where the control signal of the master unit 20 is unable to be captured within a specific time through the master unit search in step 1, a value of the storage region of the EEPROM 422 related to the number of continuous failures in the master unit search is incremented, and a value of the set value register of the timer unit 442 is rewritten in order to change the cycle of the intermittent reception in the timer unit 442 on the basis of the number of continuous failures stored in the EEPROM 422. Typically, a value of the set value register is a timer value corresponding to 2048 frames as described above, but, when the master unit search fails, thereafter, a timer value corresponding to, for example, 4096 frames which is twice the 2048 frames is written in the set value register so as to lengthen the master unit search cycle. Then, a power-off signal is output to the power supply control unit 441.

As described above, the number of continuous failures in the master unit search is grasped, a value of the set value register of the timer unit 442 is rewritten based on the number thereof, and thus the control is performed such that the timer value of the master unit search cycle increases as the number of continuous failures in the master unit search increases.

In addition, in the case where the master unit is unable to be captured within a regulated time even if the master unit is captured as a result of the master unit search of the sensor slave unit 40, control may be performed so that a timer value of the next master unit search cycle may be lengthened. The long time until the master unit is captured indicates that electric wave circumstances deteriorate in many cases, and, if this state continues, power consumption for a reception operation increases. Even in the case where the master unit is unable to be captured within a regulated time, a value of the storage region of the EEPROM 422 related to the number of continuous failures in the master unit search is incremented, and the timer unit 442 is set to lengthen the master unit search cycle, that is, to delay the timing when power supply is turned on the next time, thereby suppressing power consumption.

In addition, there is also a method of performing control such that the time limit of the master unit search is shortened as the number of continuous failures increases, depending on the number of continuous failures in the master unit search stored in the EEPROM 422 through the master unit search in step 1.

The present application is based upon and claims the benefit of priority of Japanese Patent Application No. 2011-256462 filed on Nov. 24, 2011, the contents of which are incorporated herein by reference in its entirety.

The present invention is useful, for example, for the wireless communication apparatus that is applicable to the wireless sensor, and can reduce the power consumption of the tributary station.

What is claimed is:

1. A wireless communication apparatus, comprising:
a controller;
a wireless communicator that wirelessly communicates with a different wireless communication apparatus;
a power switch that switches power supplied to the controller and the wireless communicator from a power supply;
a power supply controller that controls an on/off operation of the power switch upon receipt of a trigger for turning on/off the power supply; and
a timer that outputs to the power supply controller at expiration of a time period the trigger for turning on the power supply:
a state memory that receives a power supplied from the power supply at all times and stores an operating state of the wireless communication apparatus therein, wherein
the controller writes information that indicates an out-of-service state to the state memory and searches for another wireless signal transmitted from the different wireless communication apparatus when the wireless signal is unable to be received, and writes information that indicates an in-service state to the state memory and intermittently receives the wireless signal transmitted from the different wireless communication apparatus; and
when the wireless communicator and the controller are supplied with the power through the power switch, the controller controls the wireless communicator to receive a wireless signal from the different wireless communication apparatus, and the controller sets a given value for the expiration of the time period and outputs to the power supply controller the trigger for turning off the power supply, and
in the intermittent reception operation, the controller sets a value in the timer for when the power supply is to be turned on next and the value for when the power supply is to be turned on next is based on a difference between an assumed reception timing of a control signal from the different wireless communication apparatus and a timing when the control signal is actually received.

2. A wireless communication apparatus, comprising:
a controller;
a wireless communicator that wirelessly communicates with a different wireless communication apparatus;
a power switch that switches power supplied to the controller and the wireless communicator from a power supply;
a power supply controller that controls an on/off operation of the power switch upon receipt of a trigger for turning on/off the power supply; and
a timer that outputs to the power supply controller at expiration of a time period the trigger for turning on the power supply;
a memory that stores a number of failures when reception of the wireless signal of the different wireless communication apparatus fails consecutively, wherein
when the wireless communicator and the controller are supplied with the power through the power switch, the controller controls the wireless communicator to receive a wireless signal from the different wireless communication apparatus, and the controller sets a given value for the expiration of the time period and outputs to the power supply controller the trigger for turning off the power supply, and
when the reception of the wireless signal that is transmitted from the different wireless communication apparatus fails multiple times, the controller increments the number of failures in the memory and sets the value for the expiration of the time period depending on the number of failures stored in the memory.

3. A wireless communication apparatus which operates subordinate to a different wireless communication apparatus, the wireless communication apparatus comprising:
a controller;
a wireless communicator that wirelessly communicates with a different wireless communication apparatus; a power switch that switches power supplied to the controller and the wireless communicator from a power supply;
a power supply controller that controls an on/off operation of the power switch upon receipt of a trigger for turning on/off a power supply; and
a timer that outputs to the power supply controller at expiration of a time period the trigger for turning on the power supply;
wherein
when the power switch is turned on to supply the power through the power switch to the controller, the controller starts to control reception of a control signal transmitted from the different wireless communication apparatus, and if a wireless signal transmitted from the different wireless communication apparatus is unable to be received, the controller sets a value for the expiration of the time period and outputs to the power supply controller the trigger for turning off the power supply, and
when the expiration causes the power to be supplied to the controller, the controller starts a searching operation for searching for the signal of the different wireless communication apparatus, and if the control signal is received, the controller sets a value in the timer that corresponds to a timing at which the power supply is to be turned on at the next time based on a difference between an assumed reception timing of the control signal when the control signal is received and a timing when the control signal is actually received.

4. A wireless communication apparatus which operates subordinate to a different wireless communication apparatus, the wireless communication apparatus comprising:
a controller;
a wireless communicator that wirelessly communicates with a different wireless communication apparatus; a power switch that switches a power supplied to the controller and the wireless communicator from a power supply; and
a power supply controller that controls an on/off operation of the power switch upon receipt of a trigger for turning on/off the power supply; and
a timer that outputs the trigger for turning on the power supply to the power supply controller at expiration of a time period;
a memory that stores therein a number of failures when reception of the wireless signal of the different wireless communication apparatus fails consecutively; and
when the power switch is turned on to supply the power through the power switch to the controller, the controller starts to control reception of a control signal transmitted from the different wireless communication apparatus, and if a wireless signal transmitted from the different wireless communication apparatus is unable to be received, the controller sets a value for the expiration of the time period unit and outputs to the power supply control unit the trigger for turning off the power supply, and when the expiration causes the power to be supplied to controller, the controller starts a searching operation for searching for the wireless signal of the different wireless communication apparatus, and if the reception of the wireless signal that is transmitted from the different wireless communication apparatus fails multiple times, the controller increments the number of failures stored in the memory and sets the value for the timer expiration of the time period depending on the number of failures stored in the memory.

5. The wireless communication apparatus according to claim 4, wherein the controller increases the given value for the expiration of the time period as the number of failures of the memory unit increases.

6. The wireless communication apparatus according to claim 3, further comprising:

a first clock that receives a power supplied from the power supply at all times; and a second clock that receives the power supplied through the switch, wherein the timer measures a time period by using the first clock, and the controller operates according to a clock generated by the second clock.

* * * * *